(12) United States Patent
Yoshioka et al.

(10) Patent No.: US 7,232,623 B2
(45) Date of Patent: Jun. 19, 2007

(54) FUEL CELL, POWER SUPPLY METHOD USING FUEL CELL, FUNCTION CARD, FUEL SUPPLY MECHANISM FOR FUEL CELL, AND GENERATOR AND PRODUCTION THEREOF

(75) Inventors: Tetsuya Yoshioka, Kanagawa (JP); Yasuhiro Watanabe, Tokyo (JP); Eigo Kubota, Tokyo (JP); Koichi Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 10/187,812

(22) Filed: Jul. 2, 2002

(65) Prior Publication Data

US 2003/0012999 A1    Jan. 16, 2003

(30) Foreign Application Priority Data

| Jul. 6, 2001 | (JP) | ............................ P2001-206122 |
| Jul. 6, 2001 | (JP) | ............................ P2001-206170 |
| Jul. 6, 2001 | (JP) | ............................ P2001-206200 |
| Jul. 6, 2001 | (JP) | ............................ P2001-206223 |
| May 10, 2002 | (JP) | ............................ P2002-136156 |

(51) Int. Cl.
*H01M 2/00* (2006.01)
*H01M 2/02* (2006.01)
*H01M 2/10* (2006.01)

(52) U.S. Cl. ......................... 429/34; 429/98
(58) Field of Classification Search ................ 429/30, 429/123

See application file for complete search history.

(56) References Cited

U.S. PATENT DOCUMENTS 6,127,058 A    10/2000   Pratt et al.
6,132,895 A    10/2000   Pratt et al.
6,268,077 B1    7/2001   Kelley et al.
6,491,226 B1 *  12/2002   Nishioka ..................... 235/475

FOREIGN PATENT DOCUMENTS

| EP | 0 788 172 | 8/1997 |
| EP | 2000-268835 | 9/2000 |
| EP | 788171 | 9/2000 |
| JP | 9213359 | 8/1997 |
| JP | 2000-268835 | 9/2000 |
| WO | WO 00/52779 | 8/1997 |
| WO | WO 00/52779 | 9/2000 |

* cited by examiner

*Primary Examiner*—Patrick Joseph Ryan
*Assistant Examiner*—Julian Mercado
(74) *Attorney, Agent, or Firm*—Bell, Boyd & Lloyd LLP

(57) ABSTRACT

A fuel cell having a structure capable of certainly supplying a gas by making effective use of a limited space while ensuring the portability of the fuel cell is provided. The fuel cell includes two generators, a fuel supply portion, and two planar current collectors. Each of the generators has a proton conductor film, and a planar hydrogen side electrode and a planar oxygen side electrode disposed with the proton conductor film held therebetween. The fuel supply portion is adapted to supply a fuel to the hydrogen side electrodes of the generators. The planar current collectors, which are disposed in close-contact with the oxygen side electrodes of the generators, have gas transmission portions such as opening portions allowing the oxygen side electrodes to be opened to atmosphere. Since the oxygen side electrodes are opened to atmosphere, oxygen can be supplied to the generators without lowering a partial pressure of oxygen in air.

7 Claims, 21 Drawing Sheets

FIG. 1E

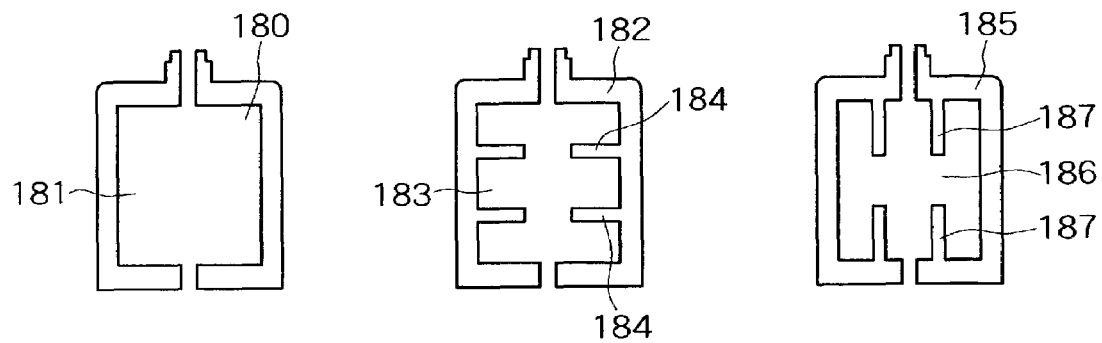
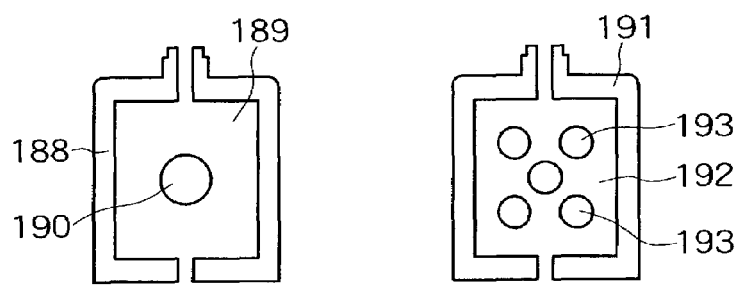
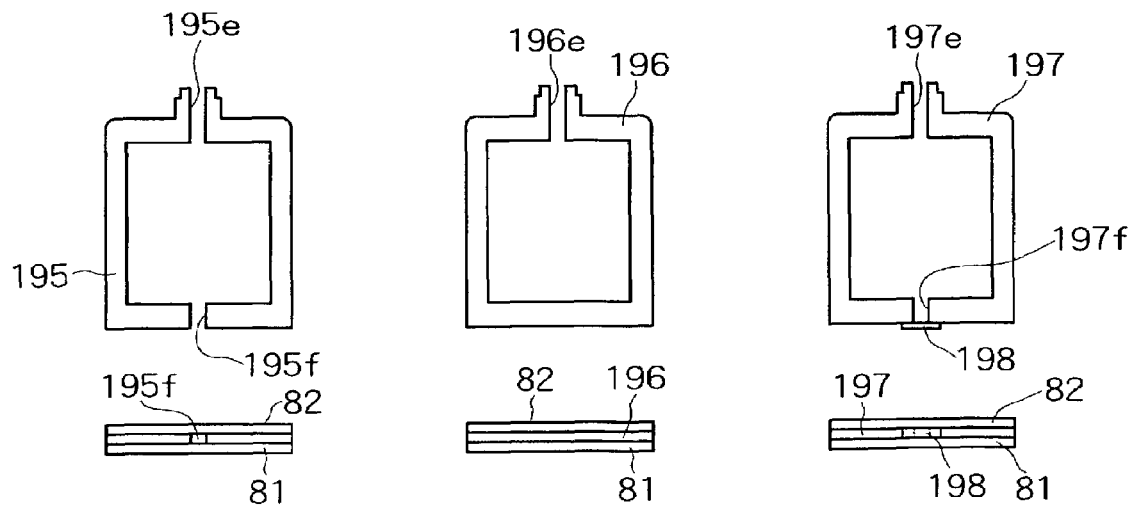

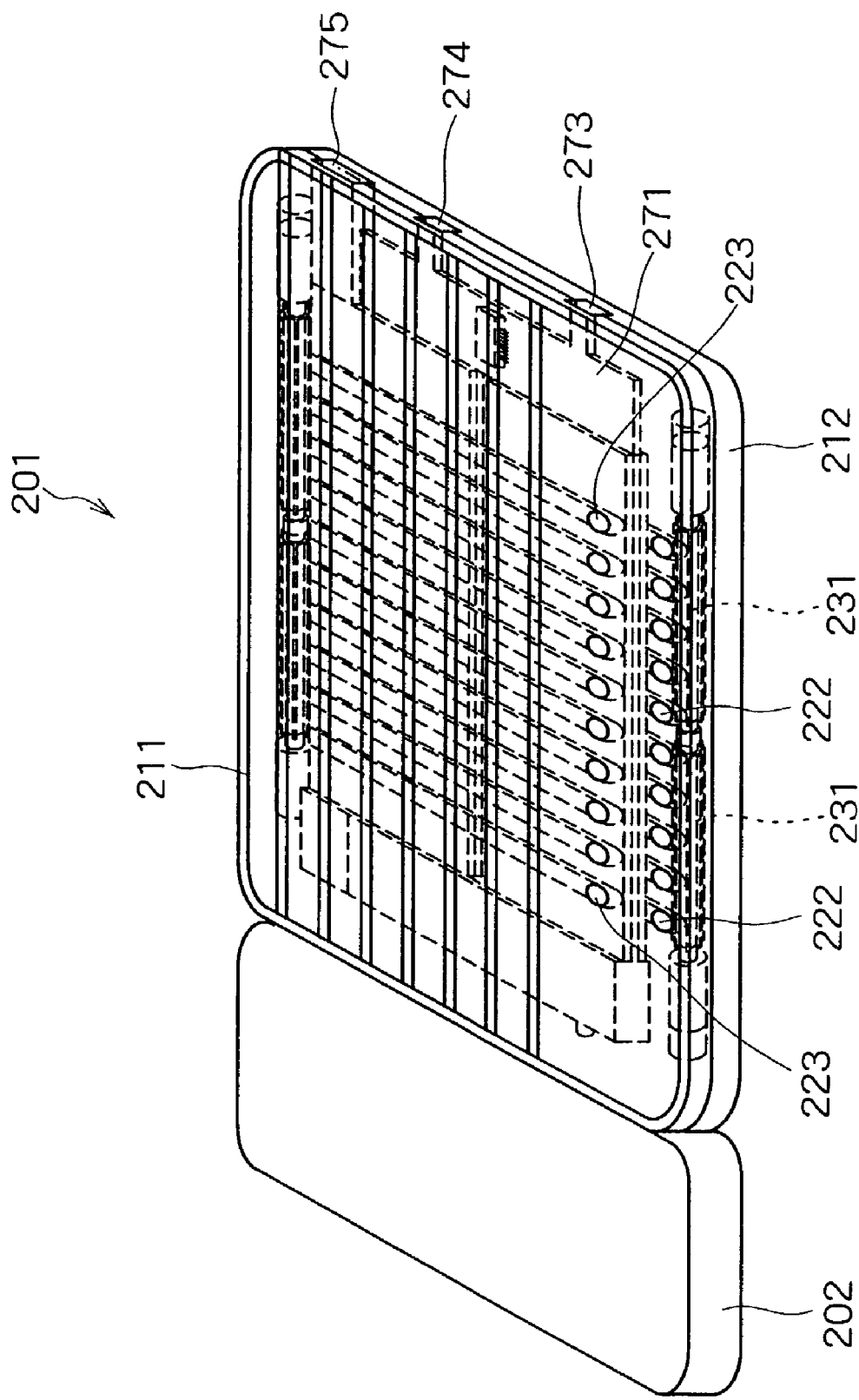

FUEL CELL, POWER SUPPLY METHOD USING FUEL CELL, FUNCTION CARD, FUEL SUPPLY MECHANISM FOR FUEL CELL, AND GENERATOR AND PRODUCTION THEREOF

RELATED APPLICATION DATA

The present application claims priority to Japanese Patent Application No. P2001-206122 filed on Jul. 6, 2001; Japanese Patent application No. P2001-206170 filed on Jul. 6, 2001; Japanese Patent Application No. P2001-206200 filed on Jul. 6, 2001; Japanese Patent Application No. P2001-206223 filed on Jul. 6, 2001; and Japanese Patent Application No. P2002-136156 filed on May 10, 2002. The above-referenced Japanese patent applications are incorporated herein by reference to the extent permitted by law.

BACKGROUND OF THE INVENTION

The present invention relates to a fuel cell using a proton conductor film or the like, a power supply method using the fuel cell, a function card making use of the fuel cell, a fuel supply mechanism for the fuel cell, and a generator using a proton conductive material or the like and a production method thereof.

Fuel cells are generally configured to generate a power from a generator by supplying a fuel gas to the generator. One example of such fuel cells includes a generator having a proton conductor film held between electrodes, wherein a desired electromotive force is obtained by supplying a fuel gas to the generator. The fuel cell of this type has been greatly expected as an on-vehicle power source used for electric cars or hybrid cars, and further, from the viewpoint of the cell structure capable of realizing easy reduction in weight and size thereof, the fuel cell of this type has been actively studied or developed to be applied not only to the existing application field of dry batteries or rechargeable batteries but also, for example, to the application field of portable equipment.

The mechanism of a fuel cell using a proton conductor film will be briefly described with reference to FIG. 34. A proton conductor film 401 is held between a hydrogen side electrode 402 and an oxygen side electrode 403. Protons ($H^+$) dissociated from hydrogen gas migrate in the proton conductor film 401 along the direction shown by an arrow in the figure from the hydrogen side electrode 402 to the oxygen side electrode 403. A catalyst layer 402a is formed between the hydrogen side electrode 402 and the proton conductor film 401, and a catalyst film 403a is formed between the oxygen side electrode 403 and the proton conductor film 401. In operation of the fuel cell, on the hydrogen side electrode 402 side, hydrogen gas ($H_2$) is supplied as a fuel gas from an inlet 412 and is discharged from an outlet 413. During the time that the hydrogen gas passes through a gas passage 415, the hydrogen gas is converted into protons, which migrate to the oxygen side electrode 403. On the oxygen side electrode 403 side, oxygen (air) supplied from an inlet 416 flows to an outlet 418 through a gas passage 417. The protons, which have reached the oxygen side electrode 403, react with the oxygen flowing in the gas passage 417, to thereby generate a desired electromotive force.

In the above-described fuel cell, if hydrogen is used as fuel, on the hydrogen side electrode as a negative electrode, a reaction ($H_2 \rightleftharpoons 2H^+ + 2e^-$) occurs at the contact interface between the catalyst and the polymer electrolyte (proton conductor film). If oxygen is used as an oxidizer, on the oxygen side electrode as a positive electrode, a reaction ($\frac{1}{2}O_2 + 2H^+ + 2e^- \rightleftharpoons H_2O$) occurs, to generate water. This means that protons supplied from the hydrogen side electrode 402 migrate to the oxygen side electrode 403 through the proton conductor film 401, to react with oxygen, thereby generating water. Such a fuel cell is advantageous in simplifying the system thereof and reducing the weight thereof because it is not required to provide any humidifier for supplying water.

In the above-described fuel cell using the proton conductor film, the proton conductor film 401 and the hydrogen side electrode 402 and the oxygen side electrode 403 disposed with the proton conductor film 401 held therebetween constitute a generator. A current collector for emergence of an electromotive force is formed for each of the hydrogen side electrode 402 and the oxygen side electrode 403.

One example of a known fuel cell having a structure including current collectors will be described with reference to FIG. 35. FIG. 35 is an exploded view in perspective of a configuration of the known fuel cell. A proton conductor film 431, through which dissociated protons migrate, is held between a hydrogen side electrode 432 and an oxygen side electrode 433. A current collector 434 is brought into close-contact with an outer surface, on the side opposed to the proton conductor film 431, of the hydrogen side electrode 432. Similarly, a current collector 435 is brought into close-contact with an outer surface, on the side opposed to the proton conductor film 431, of the oxygen side electrode 433. In the fuel cell of this type, the outer surfaces of the current collectors 434 and 435 are substantially flattened from the viewpoint of stacking. A plurality of the fuel cells each having such a structure can be easily stacked, and consequently, even if an area of each of the proton conductor films 431 of the plurality of the fuel cells is small, it is possible to obtain a large electromotive force as a whole.

The fuel cell having such a closed structure is advantageous in that it can be easily stacked on another fuel cell having the same structure, to thereby obtain a plurality of the fuel cells; however, for the stack of a plurality of these fuel cells, gases must be supplied not only to the hydrogen side but also to the oxygen side for each fuel cell. In particular, the gas must be forcibly fed to the oxygen side. Concretely, compressed oxygen or compressed air is, generally, forcibly fed by a gas supply means such as a gas cylinder or a pump. For example, in a package type fuel cell system disclosed in Japanese Patent Laid-open No. Hei 9-213359, a gas supply means (denoted by reference numeral 7 in FIG. 2 of this document) is provided inside a gas suction portion. As a result, in this fuel cell system, a space for disposing the gas supply means such as a gas cylinder or a pump must be ensured in addition to a portion functioning as a generator, and further, additional equipment for operating the gas supply means must be provided. This causes a problem in degrading the portability of the fuel cell system.

By the way, portable electronic equipment such as a notebook-size personal computer or a portable terminal is configured such that a PC card such as a card shaped memory card is inserted in a slot formed in a side portion of the equipment. The insertion of the PC card makes it possible to easily enhance the function of the notebook-size personal computer or the like while keeping the portability thereof. On the other hand, a power supply device composed of a fuel cell integrated in a removable package. For example, the fuel cell system mountable on equipment, disclosed in the above-described document, Japanese Patent Laid-open No. Hei 9-213359, is of a type using a solid polymer film, wherein the fuel cell system is housed in a cell housing portion of equipment requiring a cell source, for example, a personal computer. With this configuration, a plurality of fuel cells can be stacked in the package, and therefore, even if an area of each of proton conductor films of the fuel cells is small, it is possible to obtain a large electromotive force as a whole.

The fuel cell having such a package structure is advantageous in that it can be easily stacked on another fuel cell having the same structure, to thereby obtain a plurality of the fuel cells; however, for the stack of a plurality of these fuel cells, as described above, gases must be supplied not only to the hydrogen side but also to the oxygen side for each fuel cell. Concretely, compressed oxygen or compressed air is, generally, forcibly fed by a gas supply means such as a gas cylinder or a pump. For example, in the package type fuel cell system described in the above document, the gas supply means 7 in FIG. 2 of this document is provided inside a gas suction portion. As a result, a space for disposing the gas supply means such as a gas cylinder or a pump must be ensured in addition to a portion functioning as a generator, and further, additional equipment for operating the gas supply means must be provided. This causes a problem in degrading the portability of the fuel cell system. Since a function card is generally required to be sized so as to satisfy a size standardized under a JEIDA/PCMCIA standard, it is practically difficult to mount the above-described gas supply means, additional equipment, and the like in a space defined by a standardized thickness of 3.3 mm or 5.0 mm.

To enhance the output (current value) of the fuel cell including the generator composed of the proton conductor film 401, and the hydrogen side electrode 402 and the oxygen side electrode 403 disposed with the proton conductor film 401 held therebetween, it is effective to increase the size of the generator. For example, if the area of the proton conductor film 401 becomes twice, the current value as the output of the fuel cell becomes correspondingly twice.

In the case of increasing the size of the generator composed of the proton conductor film 401, and the hydrogen side electrode 402 and the oxygen side electrode 403 disposed with the proton conductor film 401 held therebetween, however, it is easier to cause irregularities such as camber or waviness on the planar generator. This makes it difficult to ensure uniform contact between the generator and the current collectors. As a result, for the large-sized fuel cell, there occurs a problem that a collection efficiency, that is, a ratio of a power emerged from the generator via the current collectors to a power actually generated in the generator becomes degraded. To realize uniform contact between the generator and the current collectors, it is required to apply an excess pressing force from the current collector side to the generator and to control a distribution of the pressing force. In actual, to realize ideally uniform contact, the structure of the fuel cell may be significantly complicated, and to realize such a structure, the weight and the size must be increased. In some case, such a large, heavy complicated structure obtained for realizing ideally uniform contact may become undesirable as the cell structure.

A known structure for holding a proton conductor film between a hydrogen side electrode and an oxygen side electrode will be briefly described with reference to FIG. 36. As shown in this figure, a proton conductor film 421 is somewhat larger than each of a hydrogen side electrode 422 and an oxygen side electrode 423. In a state that the proton conductor film 421 is put between the hydrogen side electrode 422 and the oxygen side electrode 423, a seal material 424 made from silicon rubber is mounted to the periphery of the hydrogen side electrode 422 and another seal material 424 is mounted to the periphery of the oxygen side electrodes 423 in such a manner as to hold the proton conductor film 421 therebetween. The seal materials 424, which are mounted to surround the peripheries of the hydrogen side electrode 422 and the oxygen side electrode 423, hold the proton conductor film 421 therebetween, and therefore, it can prevent leakage of gases such as hydrogen gas and oxygen gas or air. The hydrogen side electrode 422 is held between the seal material 424 and a current collector 425 having a plurality of holes 426 through which hydrogen is supplied to the hydrogen side electrode 422. Similarly, the oxygen side electrode 423 is held between the seal material 424 and a current collector 425 having a plurality of holes 426 through which oxygen is supplied to the oxygen side electrode 423.

In the fuel cell having such a structure, the pair of elastic seal materials 424 are mounted to both the hydrogen side and the oxygen side in such a manner as to hold the proton conductor film 421 therebetween, and accordingly, if the shape and the material of each seal material 422 are equalized, it is possible to keep a desired gas-tightness because the proton conductor film 421 is held between the uniform elastic bodies. On the contrary, if a thickness error or a variation in elastic characteristic occurs at part of the seal material 424 made from silicon rubber, a deviated stress is applied to the proton conductor film 421, thereby making it difficult to keep a desired gas-tightness around the proton conductor film 421. In particular, when both the seal materials 424 mounted to the hydrogen side electrode 422 and the oxygen side electrode 423 cause shape errors, the possibility of occurrence of leakage of gases at the proton conductor film 421 held by the defective seal materials 424 becomes higher.

SUMMARY OF THE INVENTION

An advantage of the present invention is to provide a fuel cell and a function card, each of which has a structure capable of certainly supplying a gas by making effective use of a limited space while ensuring the portability.

Another advantage of the present invention is to provide a fuel cell capable of obtaining a large electromotive force and easily realizing a uniform contact state even in the case of using a small generator, and a fuel supply mechanism suitably used for such a fuel cell.

A further advantage of the present invention is to provide a generator having a structure capable of realizing certain sealing of a fuel gas and the like and facilitating the assembly thereof, a fuel cell using the generator, and a method of producing the generator.

In an embodiment of the present invention, there is provided a fuel cell including an approximately flat-plate shaped housing having an opening portion formed in part of the housing; an approximately flat-plate shaped generator disposed in the housing, the generator including an electrolyte film interposed between a fuel side electrode and an oxygen side electrode; and air flow inducing member for inducing the flow of air around the air flow inducing member, the air flow inducing member being disposed inside the housing.

Since the opening portion is formed in the housing in which the approximately flat-plate shaped generator is housed, wherein air is led in the housing through the opening portion, it is possible to easily supply air to the oxygen side electrode of the generator. The air flow inducing member for inducing the flow of air around the air flow inducing member is disposed inside the housing. Preferably, the air flow inducing member is mounted within the same plane as a plane of the generator or within a plane parallel to the plane of the generator, and more preferably, the air flow inducing member is mounted with its longitudinal direction extending within a principal plane of the housing. As a result, it is possible to induce the flow of air without the need of a large space.

According to another embodiment of the present invention, there is provided a fuel cell including: a proton conductor film; a planar fuel side electrode and a planar oxygen side electrode disposed with the proton conductor film placed therebetween; a fuel supply for supplying fuel to the fuel side electrode; and a planar current collector having a gas transmission portion formed so as to allow the oxygen side electrode to be opened to atmosphere therethrough, the planar current collector being disposed in close-contact with the oxygen side electrode.

With this configuration, although the planar current collector is disposed in close-contact with the oxygen side electrode, the gas transmission portion allowing the oxygen side electrode to be opened to atmosphere is formed in part of the planar current collector. As a result, oxygen with a sufficient pressure can be supplied through the gas transmission portion, so that it is not required to provide a gas supply means such as gas cylinder or a pump. This makes it possible to realize space-saving in the fuel cell, and to eliminate the need of provision any additional equipment.

According to another embodiment of the present invention, there is provided a fuel cell including: a proton conductor film; a planar fuel side electrode and a planar oxygen side electrode disposed with the proton conductor film placed therebetween; a fuel supply for supplying fuel to the fuel side electrode; a planar current collector having a gas transmission portion formed so as to allow the oxygen side electrode to be opened to atmosphere therethrough, the planar current collector being disposed in close-contact with the oxygen side electrode; and a housing having a gas inlet portion formed outside the oxygen side current collector in such a manner as to be communicated to the transmission portion.

With this configuration, in addition to the structure of the fuel cell according to the present invention discussed above, the housing having the gas inlet portion is provided. Since the gas inlet portion is communicated to the gas transmission portion, the oxygen side electrode can be simply opened to atmosphere via the gas transmission portion formed in the current collector and the gas inlet portion formed in the housing. Accordingly, oxygen with a sufficiently pressure can be supplied to the oxygen side electrode via the gas transmission portion communicated to the gas inlet portion. As a result, it is possible to realize space saving in the fuel cell and to eliminate the need of provision any additional equipment.

According to another embodiment of the present invention, there is provided a fuel cell including: a substantially flat-plate shaped housing including a front surface portion having a gas inlet portion and a back surface portion having a gas inlet portion; a pair of generators disposed in the housing in such a manner that the front surface of one of the generators is opposed to the back surface of the other of the generators; fuel supply for supplying fuel to the generators, the fuel supply being held between the pair of generators; and planar oxygen side current collectors each having a gas transmission portion communicated to the gas inlet portion for allowing part of each of the generators to be opened to atmosphere, each of the oxygen side current collectors being disposed between each of the front surface portion and the back surface portion of the housing and one of the generators.

With this configuration, since the gas transmission portion for allowing the oxygen side electrode to be opened to atmosphere is formed in part of the planar current collector, oxygen with a sufficient pressure can be supplied to the oxygen side electrode through the gas transmission portion. Also, since a pair of the planar generators are formed, the area thereof becomes twice as compared with the case using only one planar generator, and accordingly, even for the size of each generator is small, an electromotive force being as large as about twice can be obtained.

According to another embodiment of the present invention, there is provided a function card inserted in a card slot provided in an apparatus main body and mounted to the apparatus main body, including: a generator including a proton conductor film, and an oxygen side electrode and a hydrogen side electrode opposed to each other with the proton conductor film put therebetween, the generator being disposed in a housing of the function card; wherein a power is generated by taking oxygen from a gas inlet portion formed in the housing to the oxygen side electrode in an atmosphere open state and supplying a fuel gas or a fuel liquid to the generator.

With this configuration, the generator including the oxygen side electrode and the hydrogen side electrode opposed to each other with the proton conductor film put therebetween is disposed in the housing of the function card, and a gas inlet portion allowing the oxygen side electrode to be opened to atmosphere is formed in the housing. As a result, oxygen with a sufficient pressure can be supplied to the oxygen side electrode via the gas inlet portion, so that it is not required to provide any gas supply means such as a gas cylinder or a pump. This makes it possible to realize space saving in the fuel cell and to eliminate the need of provision of any additional equipment.

According to another embodiment of the present invention, there is provided a function card inserted in a card slot provided in a peripheral device selectively mountable to an apparatus main body and mounted to the peripheral device, including: a generator including a proton conductor film, and an oxygen side electrode and a hydrogen side electrode opposed to each other with the proton conductor film put therebetween, the generator being disposed in a housing of the function card; wherein a power is generated by taking oxygen from a gas inlet portion formed in the housing to the oxygen side electrode in an atmosphere open state and supplying a fuel gas or a fuel liquid to the generator.

The function card according to an embodiment of the present invention discussed above is used to be directly inserted in the apparatus main body, whereas the function card according to an embodiment of the present invention is used to be inserted in a peripheral device selectively mounted to the apparatus main body. If a notebook-size personal computer is used as the apparatus main body, the above peripheral device may be exemplified by that generally called "selectable bay".

According to another embodiment of the present invention, there is provided a fuel cell including: a housing having a shape substantially the same as that of a recording medium removably mounted to an apparatus main body; and a generator including a proton conductor film, and an oxygen side electrode and a hydrogen side electrode opposed to each other with the proton conductor film put therebetween, the generator being disposed in the housing of the fuel cell; wherein a power is generated by taking oxygen from a gas inlet portion formed in the housing to the oxygen side electrode in an atmosphere open state and supplying a fuel gas or a fuel liquid to the generator.

With this configuration, since the housing of the fuel cell has a shape being substantially the same as that of a recording medium removably mounted to the apparatus main body, the fuel cell is insertable in the slot for the recording medium formed in the apparatus main body and is usable as a power source of the apparatus main body.

According to another embodiment of the present invention, there is provided a fuel cell including: a pair of planar generators supported in such a manner that the front surface of one of the generators is opposed to the back surface of the other of the generators; a pair of planar current collectors held between the generators, each of the planar current collectors having a plane, being to be in contact with the generators, which allows a gas or a liquid to pass therethrough; and an insulating film having a flow passage communicated to the generators, the insulating film being formed between the pair of current collectors.

With this configuration, since the pair of planar generators supported such that the front surface of one of the generators is opposed to the back surface of the other of the generators, the area thereof becomes twice as compared with the case using only one planar generator, and accordingly, even for the size of each of the generators is small, an electromotive force being as large as about twice can be obtained. The pair of planar current collectors, which are mounted in a region where the front surface of one of the generators is opposed to the back surface of the other of the generators, are required to allow a fuel gas such as hydrogen gas to pass therethrough, and to meet such a requirement, the insulating film serving as a spacer is disposed between the pair of current collectors. The gas passage is formed in the insulating film, and a fuel gas is fed to the pair of planar generators through the gas passage. In particular, if the insulating film is made from a synthetic resin, it can function as an elastic member elastically deformed to cause uniform contact between the pair of generators and the current collectors. As a result, it is possible to easily obtain the uniform press-contact states between the generators and the current collectors.

According to another embodiment of the present invention, there is provided a fuel supply mechanism for a fuel cell, including: a pair of planar current collectors, each having an opening portion; and an insulating film held between the pair of current collectors; wherein fuel is supplied to each of the opening portions of the pair of current collectors through a fuel passage formed in the insulating film.

With this configuration, the gas passage is formed in part of the insulating film, and a fuel gas is led in the gas passage. The fuel gas thus led in the gas passage is then supplied to a pair of generators via the opening portions formed in the planar current collectors. Since the gas passage is communicated to the pair of planar current collectors, it is possible to effectively supply a fuel gas to the pair of generators. Like the fuel cell of the present invention, the insulating film also can function as a spacer. If the insulating film is made from a synthetic resin, it can help uniform press-contact between the generators and the current collectors.

According to another embodiment of the present invention, there is provided a generator including a proton conductor film; and a pair of planar electrodes disposed with the proton conductor film put therebetween; wherein a peripheral end portion of the proton conductor film is exposed from a peripheral edge of one of the planar electrodes when the one of planar electrodes is superimposed to the proton conductor film, and a seal material is provided in such a manner as to be in close-contact with the exposed peripheral end portion of the proton conductor film.

With this configuration, an electromotive force is generated from the generator including the proton conductor film held between the pair of planar electrodes by supplying a fuel gas thereto. One of the planar electrodes is slightly smaller than the proton conductor film so that a peripheral end portion of the proton conductor film is exposed from the peripheral edge of the one of planar electrodes. The other of the planar electrodes has the same size as that of the proton conductor film. The seal material is mounted to the periphery of the one of planar electrodes in such a manner as to be brought into close-contact with the proton conductor film. As a result, it is possible to ensure good gas-tightness. Since the peripheral end portion of the proton conductor film is not held by one seal material or between a pair of seal materials, it is possible to ensure uniform sealing.

According to another embodiment of the present invention, there is provided a fuel cell including: a pair of planar hydrogen side current collectors disposed with an insulating film having a gas passage for the fuel cell; a pair of generators each having a proton conductor film, a pair of planar electrodes disposed with the proton conductor film put therebetween, and a seal material, wherein one of the planar electrodes of each of the generators is brought into close-contact with the surface of one of the planar hydrogen side current collectors in a state that a peripheral end portion of the proton conductor film is exposed from a peripheral edge of the one of planar electrodes and the seal material is in close-contact with the exposed peripheral end portion of the proton conductor film; and a pair of air side current collectors each being brought into close-contact with the other of the planar electrodes of each of the generators.

With this configuration, the gas passage is formed in part of the insulating film, and a fuel gas is led in the gas passage. The fuel gas thus led in the gas passage is then supplied to the pair of generators via the opening portions formed in the planar current collectors. The generator includes the proton conductor film held between the pair of planar electrodes. In particular, the seal material is mounted to the periphery of the one of planar electrodes in such a manner as to be brought into close-contact with the proton conductor film. As a result, it is possible to keep good gas-tightness, and hence to ensure uniform sealing. Also, since the pair of planar generators are formed, the area thereof becomes twice as compared with the case using only one planar generator, and accordingly, even for the size of each of the generators is small, an electromotive force being as large as about twice can be obtained.

According to another embodiment of the present invention, there is provided a method of producing a generator, including the steps of: forming a proton conductor film and a pair of planar electrodes with the proton conductor film put therebetween in such a manner that a peripheral end portion of the proton conductor film is exposed from a peripheral edge of one of the planar electrodes when the one of planar electrodes is superimposed to the proton conductor film; and bringing a seal material in close-contact with the exposed peripheral end portion of the proton conductor film.

With this configuration, the seal material is mounted to the periphery of the one of planar electrodes in such a manner as to be brought into close-contact with the proton conductor film. Accordingly, since the peripheral end portion of the proton conductor film is not held by one seal material or between a pair of seal materials, it is possible to ensure uniform sealing. Also, only one seal material is provided on one electrode side of each generator. That is to say, only one seal material is provided for each generator. As a result, it is possible to reduce the total number of the seal materials as compared with the related art structure.

Additional features and advantages of the present invention are described in, and will be apparent from, the following Detailed Description of the Invention and the Figures.

BRIEF DESCRIPTION OF THE DRAWINGS

FIGS. 1A to 1G are exploded views in perspective of a fuel cell card according to an embodiment of the present invention, wherein FIG. 1A shows an upper housing body, FIG. 1B shows an upper current collector, FIG. 1C shows a generator, FIG. 1D shows a hydrogen supply portion, FIG. 1E shows a generator, FIG. 1F shows a lower current collector, and FIG. 1G shows a lower housing body.

FIGS. 5A to 5C are exploded views in perspective of lower essential portions of the fuel cell card according to an embodiment of the present invention, wherein FIG. 5A shows the lower current collector, FIG. 5B shows an insulating film, and FIG. 5C shows the lower housing body.

FIGS. 6A to 6D are exploded views in perspective of the generator of the fuel cell card according to an embodiment of the present invention, wherein FIG. 6A shows a seal material, FIG. 6B shows a hydrogen side electrode, FIG. 6C shows a proton conductor film, and FIG. 6D shows an oxygen side electrode.

FIGS. 7A to 7C are exploded views in perspective of the hydrogen supply portion of the fuel cell card according to an embodiment of the present invention, wherein FIG. 7A shows a hydrogen side current collector, FIG. 7B shows insulating films, and FIG. 7C shows a hydrogen side current collector.

FIG. 8A shows the upper housing body, FIG. 8B shows an insulating film, and FIG. 8C shows the upper current collector.

FIGS. 18A to 18E are plan views showing examples of shapes of insulating films used for the hydrogen supply portion of the fuel cell according to an embodiment of the present invention.

FIGS. 19A to 19C are views, seen from top and side, showing structural examples of peripheral portions of insulating films used for the hydrogen supply portion of the fuel cell according to an embodiment of the present invention.

FIG. 20 is a perspective view showing a fuel cell according to an embodiment of the present invention.

FIGS. 21A to 21C are exploded views in perspective of the fuel cell according to an embodiment of the present invention, wherein FIG. 21A shows an upper housing body, FIG. 21B shows a generator and the like, and FIG. 21C shows a lower housing body.

DETAILED DESCRIPTION OF THE INVENTION

[First Embodiment]

Figure 1A:
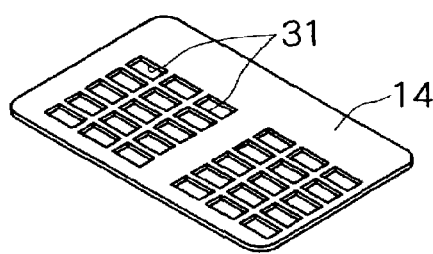
Figure 1B:
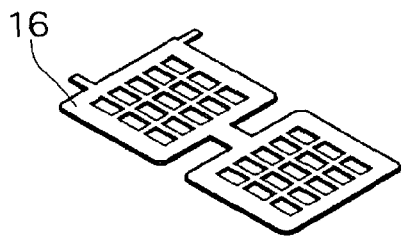
Figure 1C:
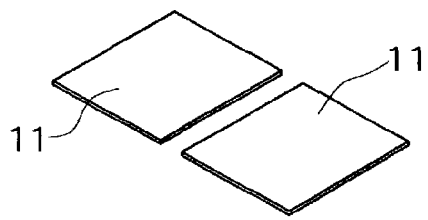
Figure 1D:
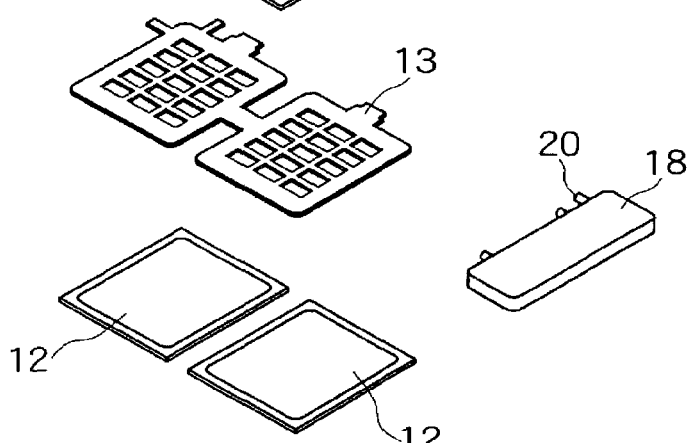
Figure 1F:
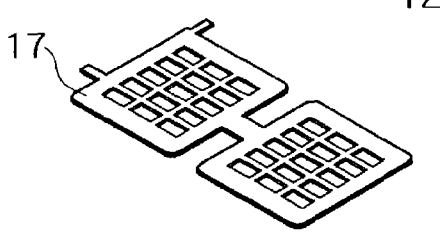
Figure 1G:
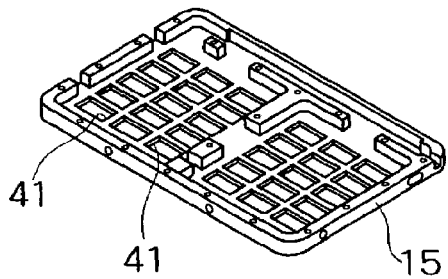

A first embodiment of a fuel cell according to the present invention will be described below with reference to the accompanying drawings.

FIGS. 1A to 1G are exploded views in perspective of a fuel cell card as one embodiment of a fuel cell of the present invention. A fuel cell card 10 according to this embodiment is formed into a shape of a function card having a PC card size by stacking seven main plate-like elements to each other. The seven main elements arranged in sequence from above are an upper housing body 14, an upper oxide side current collector 16, a pair of upper generators 11 disposed upwardly from the center, a hydrogen supply portion 13 disposed at the center for supplying hydrogen ($H_2$) as a fuel gas, a pair of lower generators 12 disposed downwardly from the center, a lower oxygen side current collector 17, and a lower housing body 15. The upper housing body 14 and the lower housing body 15 are paired to form a housing of the fuel cell card 10. A hydrogen storage stick 18 capable of supplying hydrogen to the fuel cell card 10 is formed into a plate-like shape having a thickness nearly equal to that of the fuel cell card 10, and is connectable to the fuel cell card 10. A bar-like projecting portion 20, through which hydrogen is supplied to the fuel cell card 10, is formed on a portion, on the connection side to the fuel cell card 10, of the hydrogen storage stick 18.

Figure 2:
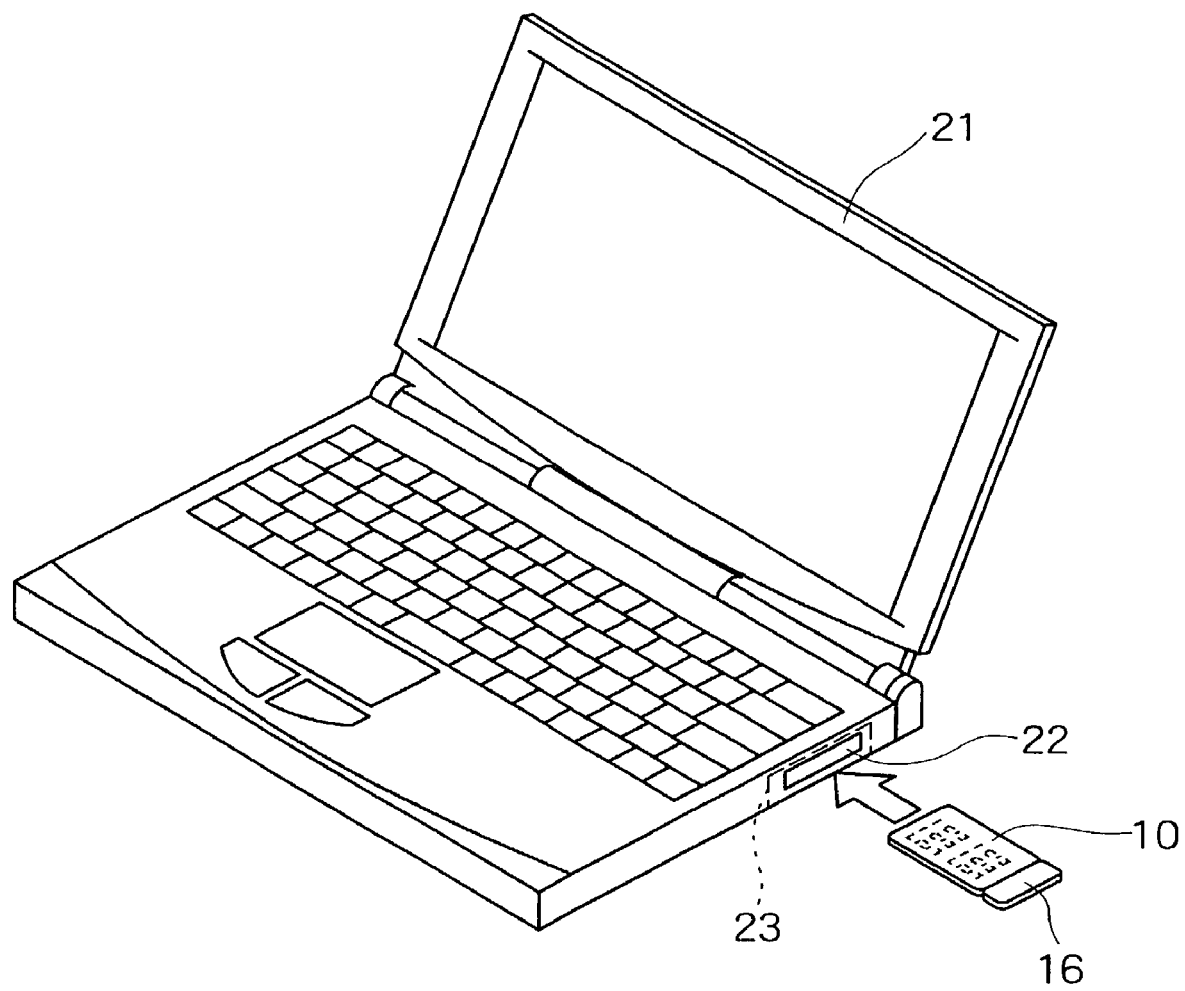
FIG. 2 is a perspective view showing a state in which the fuel cell card according to an embodiment is inserted in a notebook-size personal computer.

As shown in FIG. 2, the fuel cell card 10 is insertable in a card insertion slot 22 of an apparatus main body, exemplified by a notebook-size personal computer 21 in this embodiment, and is mountable to the notebook-size personal computer 21. While the slot 22 can be designed as a slot formed in a housing of an apparatus main body compatible to the fuel cell card 10, it may be designed as a slot having a size standardized under a JEIDA/PCMCIA standard. In this regard, the size of a slot for a PC card is specified under the JEIDA/PCMCIA standard such that the longitudinal dimension (long side) of the slot is in a range of 85.6 mm±0.2 mm and the lateral dimension (short side) of the slot is in a range of 54.0 mm±0.1 mm. The thickness of a PC card is also specified under the JEIDA/PCMCIA standard for each of Type I and Type II of the PC card such that for Type I, the thickness of a connector portion is in a range of 3.3 mm±0.1 mm and the thickness of a base portion is in a range of 3.3 mm±0.2 mm, and for Type II, the thickness of the connector portion is in a range of 3.3 mm±0.1 mm and the thickness of the base portion is in a range of 5.0 mm or less and a standard thickness of the base portion ±0.2 mm.

It is to be noted that in this embodiment, the slot 22 is provided in a side portion, on the key board side, of the main body of the notebook-size personal computer 21 representative of the apparatus main body; however, a portion in which the slot 22 is to be provided may be taken as part of a selectable bay 23 shown by a broken line in FIG. 2.

Figure 3:
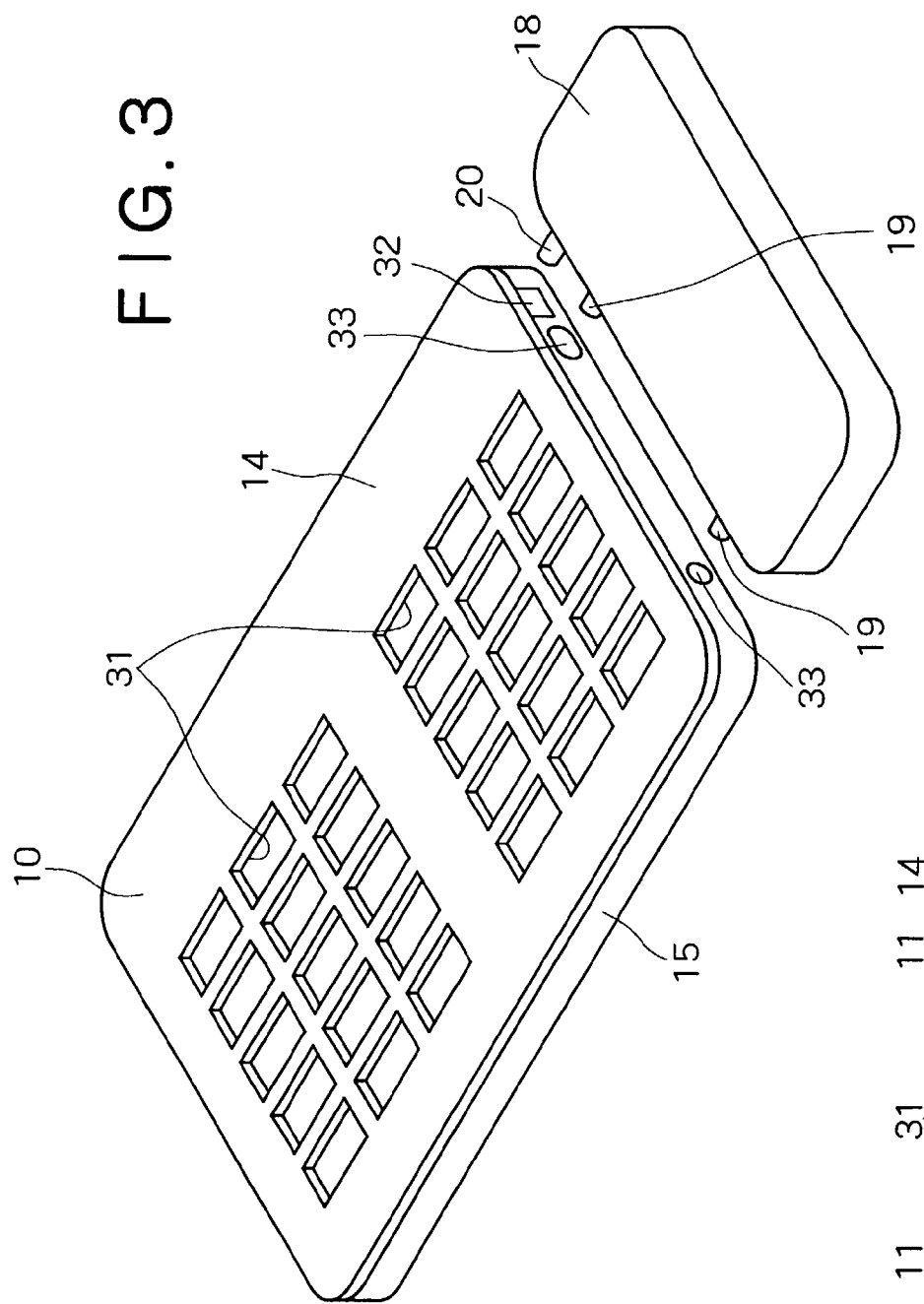
FIG. 3 is a perspective view of an external appearance of the fuel cell card according to an embodiment of the present invention.
Figure 4:
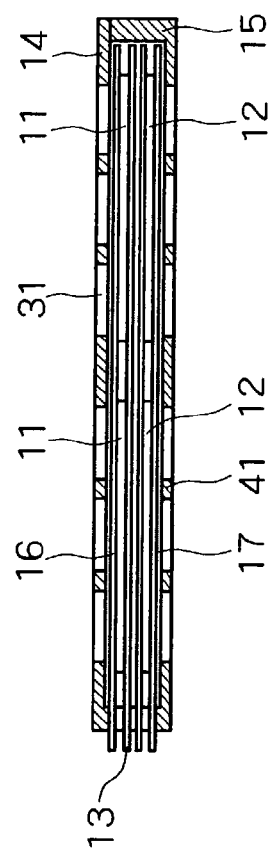
FIG. 4 is a sectional view of the fuel cell card according to an embodiment of the present invention.

FIG. 3 is a perspective view showing an assembled state of the fuel cell card 10, and FIG. 4 is a sectional view of the fuel cell card 10. Taking into account the portability of the fuel cell card 10, corners of the fuel cell card 10 are rounded. The fuel cell card 10 is assembled by fitting the upper housing body 14, which is formed into a flat-plate shape, in the lower housing body 15 with the other elements housed therebetween, and fixing the upper housing body 14 to the lower housing body 15 with screws not shown in FIG. 3. A plurality of opening portions 31 as air inlets through which oxygen is to be led in the housing are formed in the upper housing body 14. According to this embodiment, the opening portions 31 are specified such that each of the opening portions 31 is configured as an approximately rectangular through-hole, and that two sets, each of which has 15 pieces of the opening portions 31 arrayed in a five-row/three-column pattern, are provided in parallel in the horizontal direction. In this embodiment, therefore, 30 pieces of the opening portions 31 in total are provided in the upper housing body 14. With the presence of the opening portions 31, oxide side electrodes of the generators 11 (to be described later) are opened to atmosphere, to realize suction of an effective mount of oxygen without the need of provision of any special suction unit, and also to realize removal of an excess amount of water content discharged by operating the fuel cell.

In this embodiment, since each of the current collectors is formed into a grid-like pattern, the opening portions 31 are formed into the same pattern as the grid-like pattern of the current collector; however, they may be formed into any other pattern without departing from the scope of the present invention. The shape of each of the opening portions 31 may be selected from various shapes such as a circular shape, an elliptic shape, a stripe shape, and a polygonal shape. The number and the arrangement of the opening portions 31 can be variously changed. For example, two sets, each of which has 30 pieces of the opening portions 31 arrayed in a six-row/five-column pattern, may be provided in parallel in the horizontal direction, and therefore, 60 pieces of the opening portions 31 in total be provided in the upper housing body 14. In this embodiment, the opening portions 31 are formed by cutting portions corresponding to the opening portions 31 out of the plate-like upper housing 14. Also, a network or a non-woven fabric for preventing permeation or adhesion of refuse and dust may be provided to cover the opening portions 31 within such a range as not to obstruct the state of the oxygen side electrodes opened to atmosphere. As shown in FIG. 4, the lower housing body 15 has opening portions 41 corresponding to the opening portions 31 of the upper housing body 14. Like the opening portions 31 of the upper housing body 14, the shape of the opening portions 41 of the lower housing body 15 may be variously changed and also a network or non-woven fabric may be provided to cover the opening portions 41.

Figure 14A:
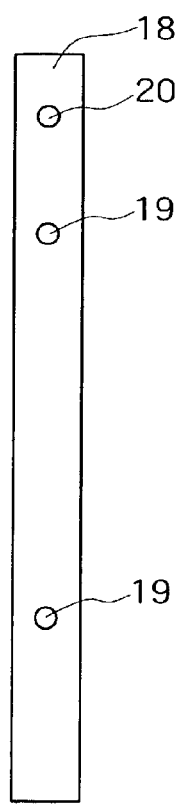
FIGS. 14A and 14C are a plan view, a left side view, and a bottom view of a hydrogen storage stick to be mounted to the fuel cell according to an embodiment of the present invention.
Figure 14B:
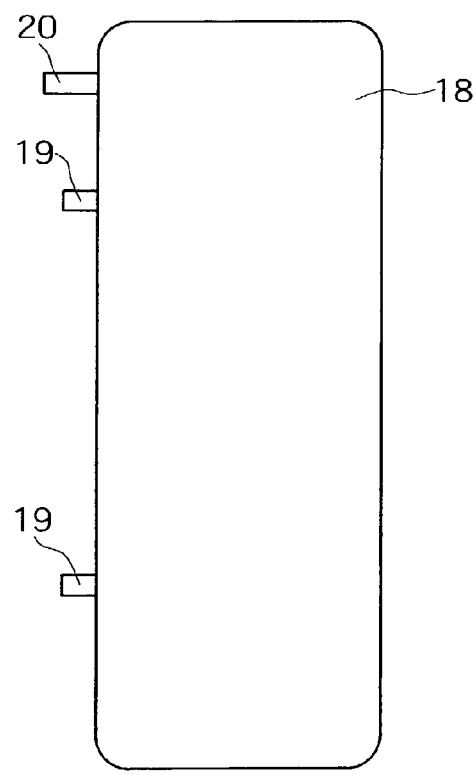
Figure 14C:
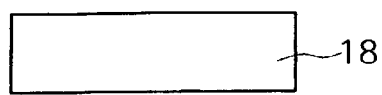

The hydrogen storage stick 18 capable of supplying hydrogen is, as will be shown in detail in FIGS. 14A to 14C, connected to the fuel cell card 10 by fitting two pins 19 formed on a side surface, on the connection side to the fuel cell card 10, of the hydrogen storage stick 18 in two fitting holes 33 formed in a side surface, on the connection side to the hydrogen storage stick 18, of the lower housing body 15. At this time, the projecting portion 20 as the hydrogen inlet of the hydrogen storage stick 18 is inserted in a rectangular fitting hole 32 formed in the side surface, on the connection side to the hydrogen storage stick 18, of the lower housing body 15, and is connected to an end portion of a hydrogen piping portion (not shown in FIGS. 3 and 14) of the hydrogen supply portion 13 extending in the housing body up to a position of the fitting hole 32. It should be appreciated that the hydrogen storage stick 18 is removably mounted to the fuel cell card 10. For example, if the residual amount of hydrogen stored in the hydrogen storage stick 18 is reduced to a specific amount or less, the hydrogen storage stick 18 is removed from the fuel cell card 10, and is replaced with a new one in which a sufficient amount of hydrogen is stored or is recovered to a reusable state by injecting hydrogen into the removed hydrogen storage stick 18. It is to be noted that in this embodiment, the hydrogen storage stick 18 is mounted to the fuel cell card 10 by fitting the pins 19 of the hydrogen storage stick 18 in the fitting holes 33; however, the hydrogen storage stick 18 may be mounted to the fuel cell card 10 by using another connecting element, for example, by using a key grooves in which the pins 19 are to be inserted or using a lock member or a magnet slid against a biasing force of a biasing spring.

Figure 5A:
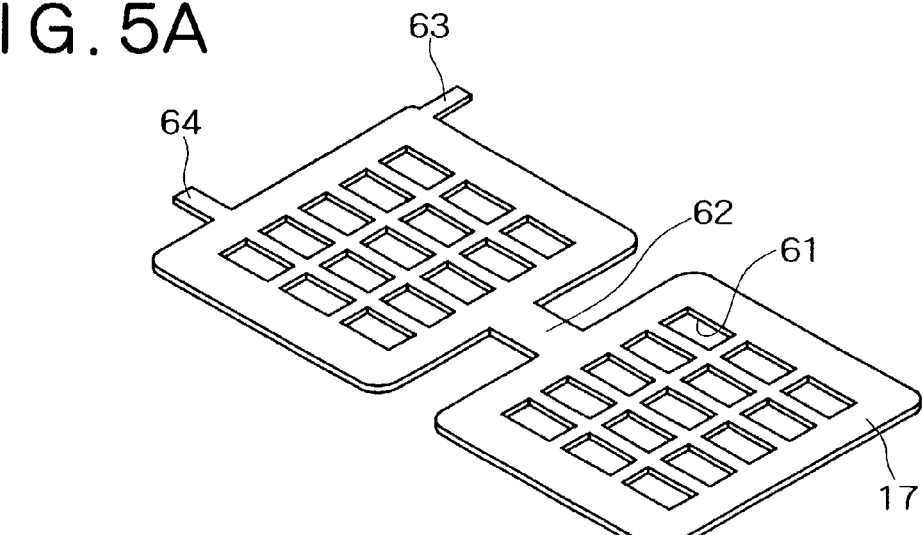
Figure 5B:
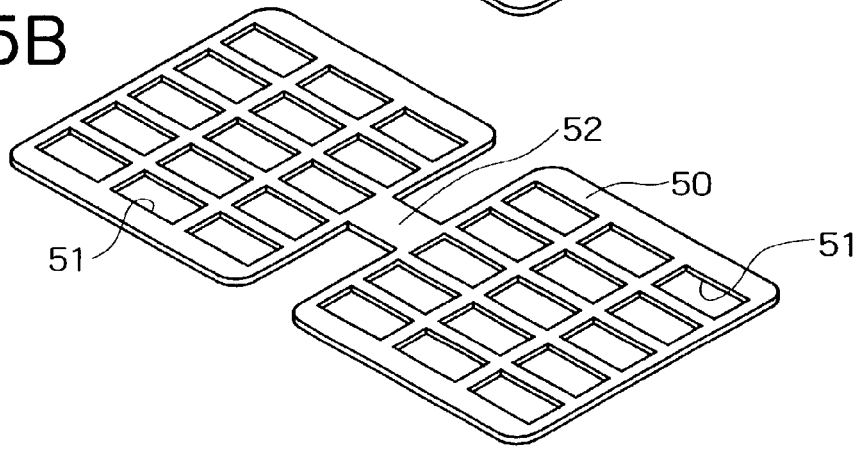
Figure 5C:
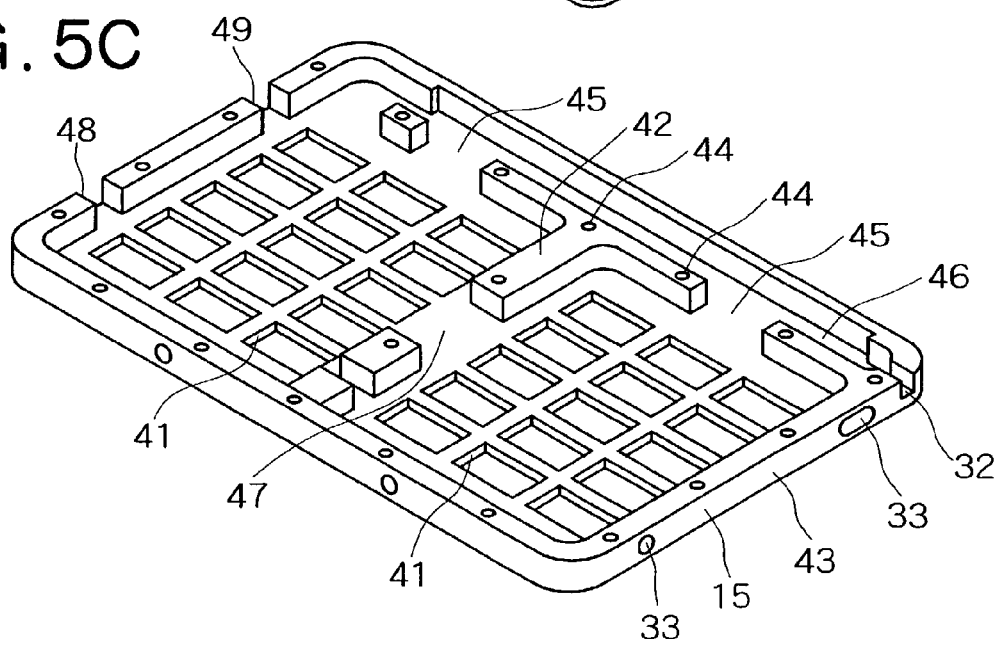
Figure 6A:
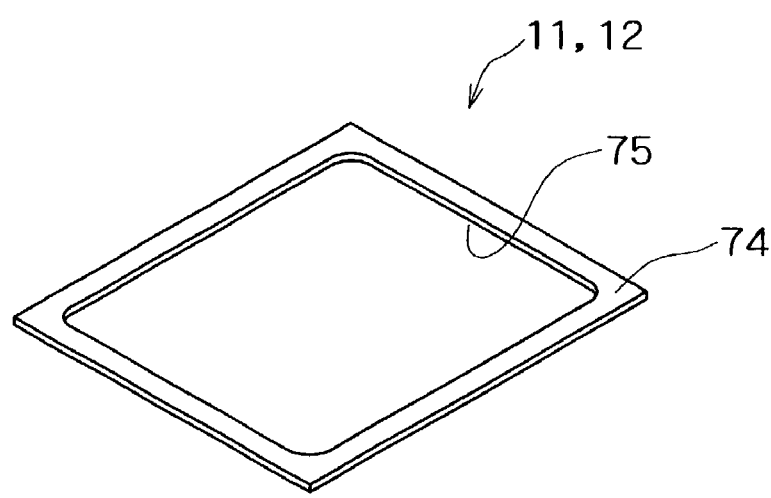
Figure 6B:
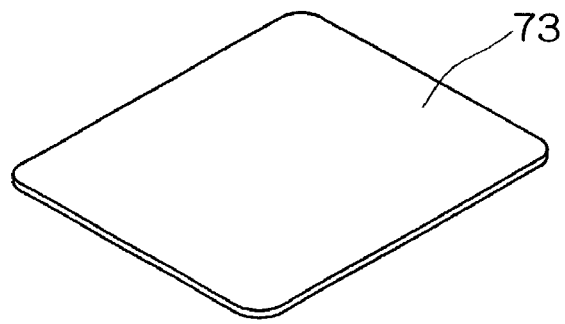
Figure 6C:
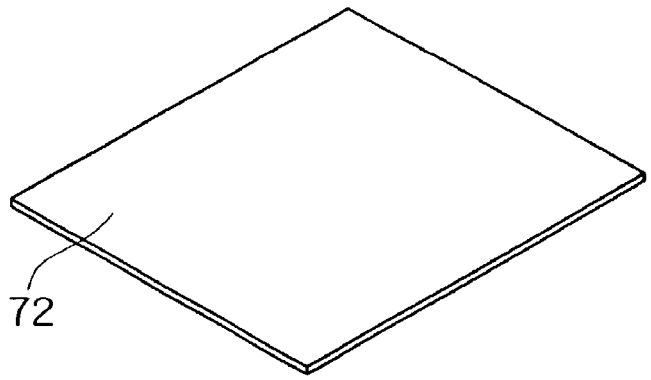
Figure 6D:
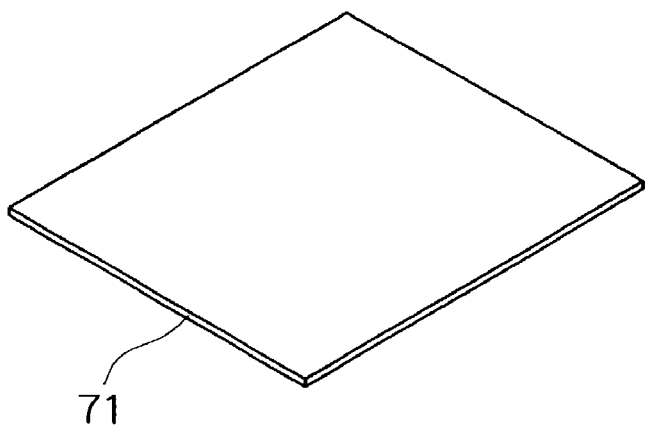

Each of the elements of the fuel cell card 10 will be described in sequence below. FIGS. 5A to 5C are perspective views showing the lower oxygen side current collector 17, an insulating film 50, and the lower housing body 15, respectively. The lower housing body 15 may be made from a metal material, for example, stainless steel, iron, aluminum, titanium, magnesium, the like or combinations thereof, or a resin material excellent in heat-resistance and chemical resistance, for example, epoxy resin, ABS resin, polystyrene, PET, polycarbonate, the like or combinations thereof. Alternatively, the lower housing body 15 may be made from a composite material such as fiber-reinforced resin or the like. Like the opening portions 31 of the upper housing body 14, two sets of the above-described opening portions 41 in the shapes of rectangular through-holes, each set of the opening portions 41 being arrayed in a five-row/three-column pattern, are formed in a flat-plate portion of the lower housing body 15. The opening portion 41 is configured as a rectangular through-hole having a shape being substantially the same as that of the opening portion 31 of the upper housing body 14.

The interior of the lower housing body 15 is generally partitioned into three housing portions: a pair of generator housing portions for housing the pair of generators 11 and the pair of generators 12, and a piping housing portion 46 for housing the hydrogen piping portion of the hydrogen supply portion 13 (to be described later). The housing portions are partitioned from each other by means of projecting rib portions 42 raised from the bottom surface of the lower housing body 15 and a side wall portion raised along the peripheral edge of the lower housing body 15. Upper end surfaces of the projecting rib portions 42 and the side wall portion are to be brought into direct-contact with the back surface of the upper housing body 14, and therefore, they are formed into approximately flat surfaces. A plurality of screw holes 44 are provided in the upper surfaces of the projecting rib portions 42 and the side wall portion. The projecting rib portions 42 are formed into shapes usable as a positioning member for positioning the upper oxide side current collector 16, the pair of generators 11 and the pair of generators 12, the hydrogen supply portion 13, and the lower oxygen side current collector 17, each of which will be described in detail later.

As described above, a side surface 43, on the connection side to the hydrogen storage stick 18, of the lower housing body 15, has the pair of fitting holes 33 and also has a side surface wall and a bottom surface wall forming the fitting hole 32 to be connected to the end portion of the hydrogen piping portion. A side wall, opposite to the side surface 43, of the lower housing body 15, has a pair of electrode extraction grooves 48 and 49. Power emergence pieces 64 and 114 of the oxygen side current collector 16 and 17 (to be described later) to be connected to the oxygen side electrodes project in the electrode extraction groove 48. Meanwhile, power emergence pieces 94-1 and 94-2 of hydrogen side current collectors 81 and 82 of the hydrogen supply portion 13 (to be described later) to be connected to hydrogen side electrodes of the generators 11 and 12 project in the electrode extraction groove 49. Two communication grooves 45 for supplying hydrogen gas from the hydrogen piping portion to the hydrogen supply portion 13 put between the pairs of generators 11 and 12 are formed in one of the projecting rib portions 42 located between the piping housing portion 46 for housing the hydrogen piping portion and the generator housing portions for housing the pairs of generators 11 and 12. A communication groove 47 is formed in one of the projecting rib portions 42 located between the pair of generator housing portions disposed in parallel in the horizontal direction. A connecting portion 112 of the current collector 16 and a connecting portion 62 of the current collector 17 can be housed in the connection groove 47.

The insulating film 50 is disposed between the lower housing body 15 and the lower oxygen side current collector 17. The insulating film 50 is made from polycarbonate and has a thickness of about 0.3 mm. A pair of grid-like regions are formed in the insulating film 50. Two sets of opening portions 51, each set of the opening portions 51 being arrayed in a five-row/three-column pattern, are formed in the pair of grid-like regions of the insulating film 50 in such a manner as to be aligned to the two sets of the opening portions 41 arrayed in the two five-row/three-column patterns of the lower housing body 15 in the vertical direction. The above-described connecting portion 52 to be fitted in the connection groove 47 of the lower housing body 15 is provided on an approximately central portion of the insulating film 50.

The lower oxygen side current collector 17 is typically formed of a metal plate with its surfaces treated by gold plating. The lower oxygen side current collector 17 is to be brought into contact with the oxygen side electrodes of the generators 12 (to be described later), to supply oxygen via two sets of opening portions 61 (each set of the opening portions 61 are arrayed in a five-row/three-column pattern) formed in the lower oxygen side current collector 17. Each of the opening portions 61, which is largely opened, functions as a gas transmission portion of the current collector 17. Since the two sets of the opening portions 61 arrayed in the two five-row/three-column patterns are aligned to the two sets of the opening portions 51 arrayed in the two five-row/three-column patterns of the insulating film 50 and the two sets of the opening portions 41 arrayed in the two five-row/three-column patterns of the lower housing body 15 in the vertical direction, the oxygen side electrodes of the generators 12 are opened to atmosphere, to thereby supply oxygen to the generators 12 without lowering the pressure, that is, the partial pressure of oxygen in air. On the other hand, moisture is produced on the surfaces of the oxygen side electrodes of the generators 12 at the time of generation of an electromotive force; however, such moisture can be desirably removed because the oxygen side electrodes are opened to atmosphere through the large opening portions 61. The above-described power emergence piece 64, which is to be disposed so as to project from the electrode extraction groove 48, is formed as a rectangular piece extending in the longitudinal direction of the fuel cell card 10 on the lower oxygen side current collector 17 at a position corresponding to that of the electrode extraction groove 48. A projecting portion 63 for positioning and holding the lower oxygen side current collector 17 is formed at a side edge of the lower oxygen side current collector 17 by making effective use of a dead space on the depth side of the hydrogen piping portion. It is to be noted that it is not required to provide all of the power emergence pieces 64, 94-1 and 94-2, and 114, and the projecting portions 63, 93-1 and 93-2, and 113. For example, if the projecting portions 93-2 is electrically connected to the projecting portion 113 and the power emergence pieces 64 and 94-1 and 94-2 are taken as external output terminals, the other power emergence pieces may be omitted. It is to be noted that the lower oxygen side current collector 17 may be made from a conductive plastic containing a carbon material, of a metal film formed on a supporting member.

Figure 12:
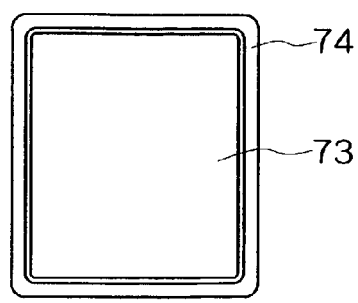
FIG. 12 is a plan view of the generator of the fuel cell card according to an embodiment of the present invention.
Figure 13:
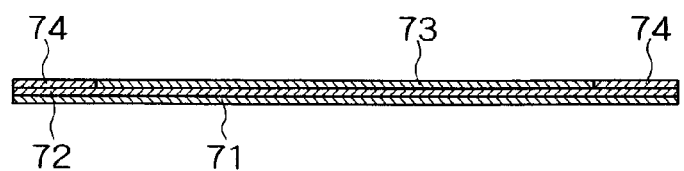
FIG. 13 is an enlarged sectional view of the generator of the fuel cell card according to an embodiment of the present invention.

The structure of each of the generators 11 and 12 will be described below with reference to FIGS. 6, 12, and 13. The generators 11 and 12, which have the common structure, are different from each other only in that the generator 11 is disposed on the upper side in the housing in such a manner that the hydrogen side electrode 73 is directed downwardly (toward the center side of the housing) and the oxygen side electrode 71 is directed upwardly (toward the outer side of the housing), whereas the generator 12 is disposed on the lower side in the housing in such a manner that the hydrogen side electrode 73 is directed upwardly (toward the center side of the housing) and the oxygen side electrode 71 is directed downwardly (toward the outer side of the housing). In other words, the generators 11 and 12 having the same structure are mounted with their postures reversed to each other in the vertical direction.

A proton conductor film 72 representative of a solid polymer film, which is formed into an approximately rectangular shape close to a square shape, is provided in each of the generators 11 and 12. During power generation, protons, which have been dissociated, migrate in the proton conductor film 72. The oxygen side electrode 71 is in close-contact with one surface of the proton conductor film 72 and the hydrogen side electrode 73 is in close-contact with the other surface of the proton conductor film 72, whereby the proton conductor film 72 is held between the oxygen side electrode 71 and the hydrogen side electrode 73. The oxygen side electrode 71 formed into an approximately rectangular shape close to a square shape has a size being substantially the same as that of the proton conductor film 72, whereas the hydrogen side electrode 73 formed into an approximately rectangular shape close to a square shape has a size smaller than that of each of the oxygen side electrode 71 and the proton conductor film 72. Accordingly, in a state that the hydrogen side electrode 73 is stuck on the proton conductor film 72, a peripheral portion, having a width of about 2 mm, of the proton conductor film 72 is exposed. As shown in FIG. 12, according to this embodiment, a seal material 74 particularly in the form of a gasket is mounted in such a manner as to be in close-contact with the peripheral portion of the proton conductor film 72 exposed in the state that the hydrogen side electrode 73 is stuck on the proton conductor film 72. In this embodiment, a material having high elasticity and air-tightness, for example, silicon rubber is used as the seal material 74 in the form of a gasket. A large hole 75 formed in the seal material 74 is fitted to the outer peripheral edge of the hydrogen side electrode 73 smaller than the proton conductor film 72. On the other hand, since the oxygen side electrode 71 is basically opened to atmosphere via the large opening portions formed in the current collector and the housing body, gas sealing using such a gasket is not needed. As a result, it is possible to reduce the number of parts and the number of assembling steps. The thickness of the seal material 74 in the form of a gasket is set to nearly equal to or more than that of the hydrogen side electrode 73. For example, of the thickness of the hydrogen side electrode 73 is set to about 0.2 mm, the thickness of the seal material 74 may be set to about 0.3 mm. When the current collector is pressed to the generator 11 or 12, the seal material 74 is elastically contracted in the thickness direction by an amount of about 0.1 mm, to realize equal contact between the current collector and each of the seal material 74 and the hydrogen side electrode 73 located inside the seal material 74, thereby improving electric characteristics of the fuel cell. Also, since no seal material is present on the oxygen side electrode 71, as compared with a known structure that seal materials are formed on both sides of a proton conductor film, the rigidity of an end portion of the proton conductor film 72 certainly becomes higher independently of a variation in characteristic of the seal material, and thereby the air-tightness characteristic is significantly improved. In addition, the contact plane of the hydrogen side electrode 73, which is smaller than the proton conductor film 72, with the seal material 74 may be formed as a vertical plane; however, the contact plane of the hydrogen side electrode 73 is preferably formed as an inversely tapered plane. In this case, a wall plane of the hole 75 of the seal material 74 may be formed as a normally tapered plane. With this configuration, it is possible to improve the adhesiveness between the seal material 74 and the proton conductor film 72.

With respect to the number of the generators 11 and 12, as described above, in the housing of the fuel cell card 10, the pair of generators 11 are horizontally disposed in parallel on the upper side and the pair of generators 12 are horizontally disposed in parallel on the lower side. Powers are taken out of these generators 11 and 12 via the common current collectors 16 and 17, and the like. As a result, the circuit of the generators 11 and 12 is equivalent to a circuit having parallel circuits of two cells. The four generators 11 and 12 can be connected in parallel by short-circuiting the two hydrogen side current collectors (to be described later) to each other and also short-circuiting the oxygen side current collectors 16 and 17 to each other. The four generators 11 and 12 can be also connected in series by cutting off the connection between the current collectors composed of the two hydrogen side current collectors and the two oxygen side current collectors 16 and 17 once in the space of the above-described communication groove 47 of the lower housing body 15 and then electrically connecting the hydrogen side current collectors to the oxygen side current collectors by wire bonding or wiring pieces, thereby connecting the upper side generators 11 to the lower side generators 12.

The structure of the hydrogen supply portion 13 will be described below with reference to FIGS. 7A to 7C, 9, 10 and 11. The hydrogen supply portion 13 is a member positioned at the center of the fuel cell card 10 in the vertical direction, and has a function to supply hydrogen as a fuel gas in a space between the generators 11 and 12 and performing power emergence by hydrogen side current collectors of the hydrogen supply portion 13. The hydrogen supply portion 13 includes a pair of hydrogen side current collectors 82 and 81, two sets of insulating films 83 and 84 held between the hydrogen side current collectors 82 and 81, which function as gas passages communicated to the generators 11 and 12, and a hydrogen piping portion 91 for supplying hydrogen as a fuel gas to the generators 11 and 12 via the current collectors 82 and 81.

Figure 7A:
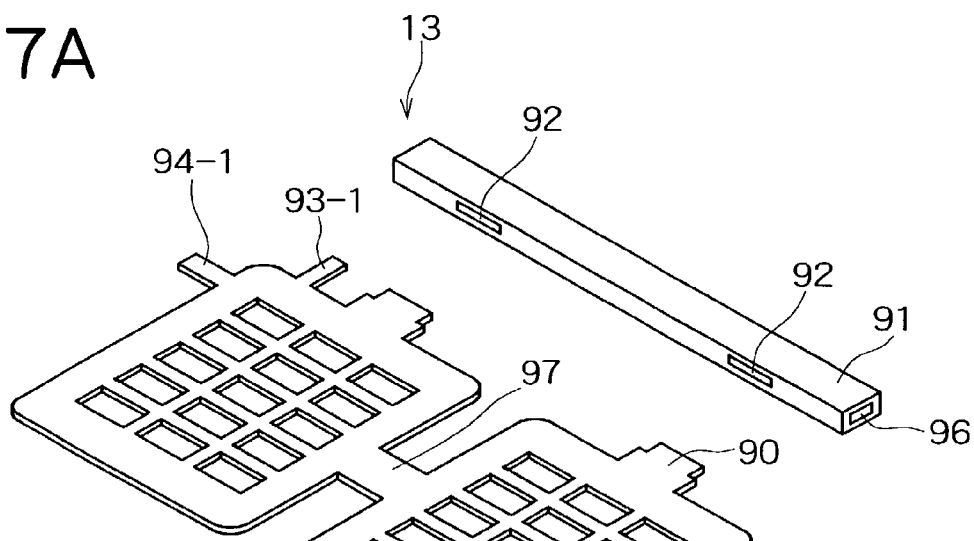
Figure 7B:
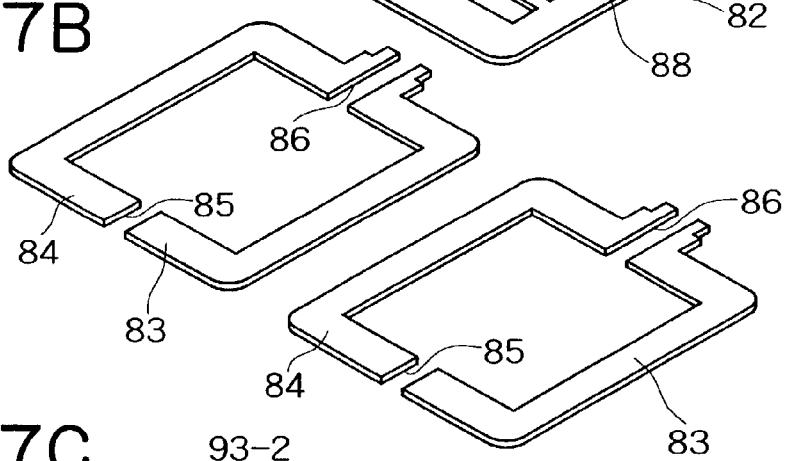
Figure 7C:
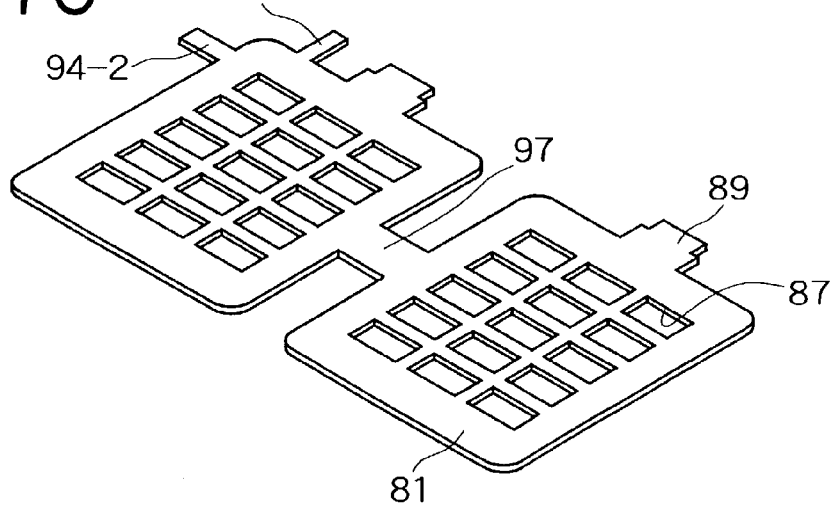
Figure 8A:
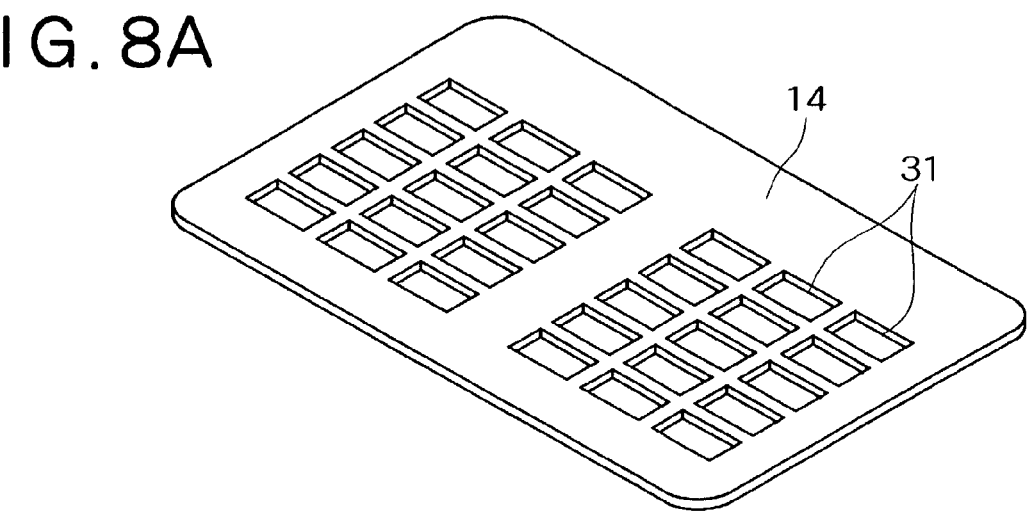
FIGS. 8A to 8C are exploded views in perspective of upper essential portions of the fuel cell card according to an embodiment of the present invention, herein
Figure 8B:
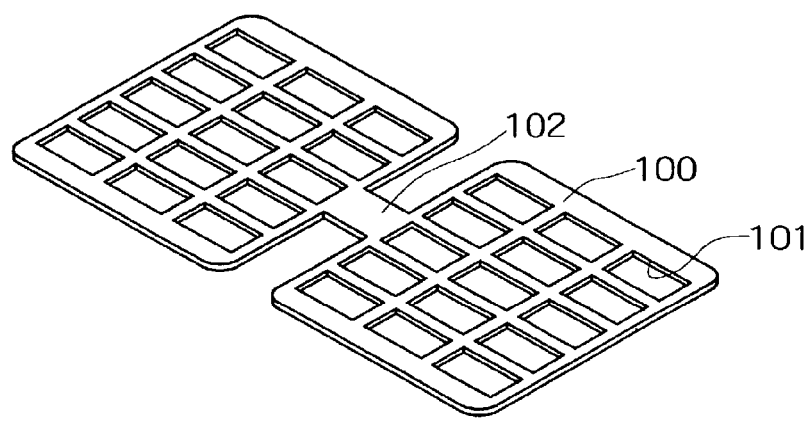
Figure 8C:
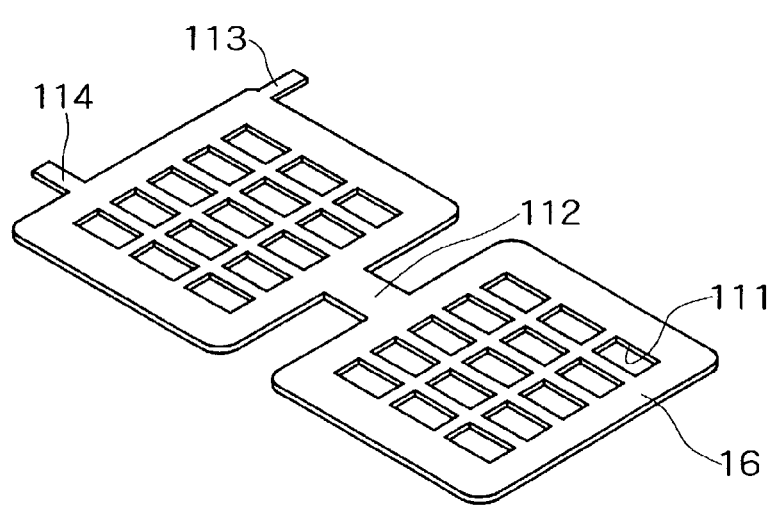
Figure 9:
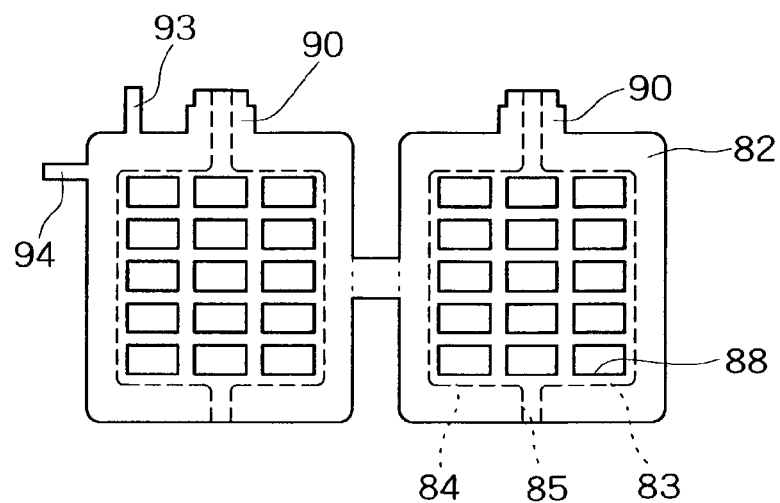
FIG. 9 is a plan view showing part of the hydrogen supply portion of the fuel cell card according to an embodiment of the present invention.
Figure 10:
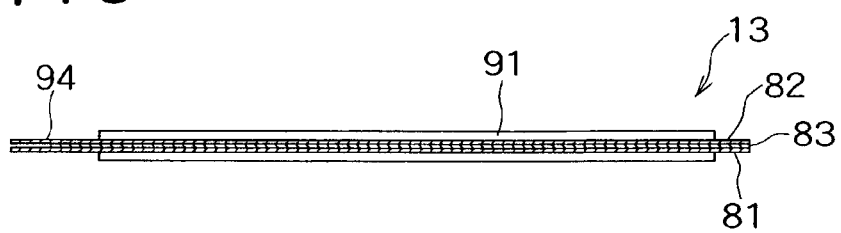
FIG. 10 is a sectional view of the hydrogen supply portion of the fuel cell card according to an embodiment of the present invention.
Figure 11:
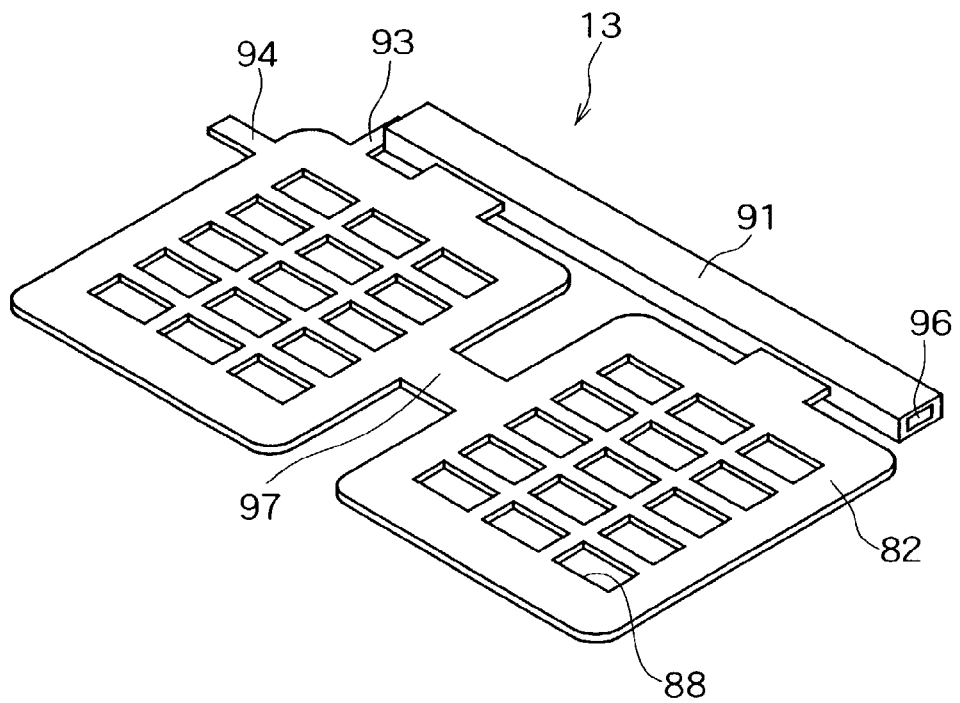
FIG. 11 is a perspective view of the hydrogen supply portion of the fuel cell card according to an embodiment of the present invention.

The hydrogen side current collector 81 is a member brought into area-contact with the hydrogen side electrodes 73 formed on the front surfaces of the pair of lower side generators 12. The contact plane with the generators 12 are configured to pass hydrogen gas therethrough. The hydrogen side current collector 81 is formed of a metal plate with its surfaces treated by gold plating. The back surface side of the hydrogen side current collector 81 in FIG. 7C is brought into contact with the hydrogen side electrodes 73 of the generators 12. The hydrogen side current collector 81 has two sets of opening portions 87, each set of the opening portions 87 being arrayed in a five-row/three-column pattern. Hydrogen is supplied from the hydrogen side current collector 81 to the hydrogen side electrodes 73 of the generators 12 via the opening portions 87. Since the opening portions 87 are formed in the contact plane of the hydrogen side current collector 81 with the generators 12, it is possible to supply hydrogen gas to the flat-plate shaped generators 12 over a wide range thereof. A connecting portion 97 to be fitted in the above-described communication groove 47 of the lower side housing body 15 (see FIG. 5C) is provided at an approximately central portion of the hydrogen side electrode 81.

The hydrogen side current collector 82 is a member brought into area-contact with the hydrogen side electrodes 73 formed on the back surfaces of the pair of upper side generators 11. The contact plane with the generators 11 are configured to pass hydrogen gas therethrough. Like the hydrogen side current collector 81, the hydrogen side current collector 82 is formed of a metal plate with its surfaces treated by gold plating. The front surface side of the hydrogen side current collector 82 in FIG. 7A is brought into contact with the hydrogen side electrodes 73 of the generators 11. The hydrogen side current collector 82 has two sets of opening portions 88, each set of the opening portions 88 being arrayed in a five-row/three-column pattern. Hydrogen is supplied from the hydrogen side current collector 82 to the hydrogen side electrodes 73 of the generators 11 via the opening portions 88. Since the opening portions 88 are formed in the contact plane of the hydrogen side current collector 82 with the generators 11, it is possible to supply hydrogen gas to the flat-plate shaped generators 11 over a wide range thereof. A connecting portion 97 to be fitted in the above-described communication groove 47 of the lower side housing body 15 (see FIG. 5C) is provided at an approximately central portion of the hydrogen side electrode 82.

The hydrogen side current collectors 81 and 82 are disposed in such a manner that the back surface of the upper side current collector 82 is opposed to the front side of the lower side current collector 81 with the two sets of insulating films 83 and 84 put as a spacer therebetween. Each of the pair of insulating films 83 and 84 is formed from a film of a resin such as polycarbonate into an approximately U-shape by dies cutting. As shown in FIG. 7B, the insulating films 83 and 84 are paired with their U-shaped recesses facing to each other, to form at a central portion thereof an approximately rectangular space functioning as a gas passage. The approximately rectangular gas passage nearly corresponds to a region of one set of the opening portions 87 arrayed in the five-row/three-column pattern of the hydrogen side current collector 81 and also corresponds to a region of one set of the opening portions 88 arrayed in the five-row/three-column pattern of the hydrogen side current collector 82. A hydrogen inlet 86 communicated to a hollow portion of the hydrogen piping portion 91 is formed in one side edge, on the hydrogen piping portion 91 side, of the combined body of the pair of insulating films 83 and 84, and a leakage hole 85 is formed in the other side edge, opposed to the hydrogen inlet 86, of the combined body of the pair of insulating films 83 and 84. The leakage hole 85 may be replaced with an openable/closable valve, and in some cases, the leakage hole 85 may be not formed. The height of the two sets of insulating films 83 and 84 defines the space between the hydrogen side current collectors 81 and 82 disposed such that the front surface of the current collector 81 is opposed to the back surface of the current collector 82 with the insulating films 83 and 84 put therebetween. In other words, the thickness of the hydrogen supply portion 13 in the height direction is determined by the height of the two sets of insulating films 83 and 84.

The hydrogen piping portion 91 is a piping member having a rectangular cross-section extending in the longitudinal direction of the fuel cell card 10. A fitting hole 96, in which the projecting portion 20 of the hydrogen storage stick 18 is to be fitted, is formed in an end portion, on the connection side to the hydrogen storage stick 18, of the hydrogen piping portion 91. The hydrogen piping portion 91 is hollowed so as to allow hydrogen to pass therethrough. A hydrogen storage alloy member may be disposed in part of the hydrogen piping portion 91. The hydrogen piping portion 91 is connected to the hydrogen side current collectors 81 and 82 by inserting leading ends of projecting portions 89 and 90 of the hydrogen side electrodes 81 and 82 in two horizontally elongated insertion ports 92 formed in a side surface of the hydrogen piping portion 91. In the state being inserted in the insertion ports 92 of the hydrogen piping portion 91, the projecting portions 89 and 90, which project from side end portions of the hydrogen side electrodes 81 and 82 along the planes of the hydrogen side electrodes 81 and 82, are stably, horizontally supported by the side end portions of the hydrogen side electrodes 81 and 82. In the hydrogen side electrodes 82 and 81, the above-described power emergence pieces 94-1 and 94-2, which are to be located so as to project from the electrode extraction groove 49 of the lower housing body 15 (see FIG. 5C), are respectively formed as rectangular pieces extending in the longitudinal direction of the fuel cell card 10 at a position corresponding to that of the electrode extraction groove 49. The above-described projecting portions 93-1 and 93-2 for positioning and holding the hydrogen side electrodes 82 and 81 are respectively formed at side ends of the hydrogen side electrodes 82 and 81 by making effective use of a dead space on the depth side of the hydrogen piping portion 91. Fuel may be supplied to the left side generators from the left side insertion port 92, and also fuel may be supplied to the right side generators from the right side insertion port 92. Alternatively, fuel may be supplied from one of the insertion ports 92 to the generators through one passage communicated between the left side generators and the right side generators.

FIGS. 5A to 8C are perspective views showing the upper housing body 14, an insulating film 100, and the upper oxygen side current collector 16 disposed under the upper housing body 14, respectively. Like the lower housing body 15, the upper housing body 14 may be made from a metal material, for example, stainless steel, iron, aluminum, titanium, magnesium the like or combinations thereof, or a resin material excellent in heat-resistance and chemical resistance, for example, epoxy resin, ABS resin, polystyrene, PET, polycarbonate the like or combinations thereof. Alternatively, the upper housing body 14 may be made from a composite material such as fiber-reinforced resin. Two sets of the above-described opening portions 31 in the shapes of rectangular through-holes, each set of the opening portions 31 being arrayed in a five-row/three-column pattern, are formed in the upper housing body 14.

The insulating film 100 is disposed between the upper housing body 14 and the upper oxygen side current collector 16. The insulating film 100 is made from polycarbonate and has a thickness of about 0.3 mm. A pair of grid-like regions are formed in the insulating film 100. Two sets of opening portions 101, each set of the opening portions 101 being arrayed in a five-row/three-column pattern, are formed in the pair of grid-like regions of the insulating film 100 in such a manner as to be aligned to the two sets of the opening portions 31 arrayed in the two five-row/three-column patterns of the upper housing body 14 in the vertical direction. The above-described connecting portion 102 to be fitted in the connection groove 47 of the lower housing body 15 is provided on an approximately central portion of the insulating film 100.

The upper oxygen side current collector 16 is typically formed of a metal plate with its surfaces treated by gold plating. The upper oxygen side current collector 16 is to be brought into contact with the oxygen side electrodes 71 of the upper generators 11, to supply oxygen via two sets of opening portions 111 (each set of the opening portions 111 are arrayed in a five-row/three-column pattern) formed in the upper oxygen side current collector 16. Each of the opening portions 111, which is largely opened, functions as a gas transmission portion of the current collector 16. Since the two sets of the opening portions 111 arrayed in the two five-row/three-column patterns are aligned to the two sets of the opening portions 101 arrayed in the two five-row/three-column patterns of the insulating film 100 and the two sets of the opening portions 31 arrayed in the two five-row/three-column patterns of the upper housing body 14 in the vertical direction, the oxygen side electrodes 71 of the generators 11 are opened to atmosphere, to thereby supply oxygen to the generators 11 without lowering the pressure, that is, the partial pressure of oxygen in air. On the other hand, moisture is produced on the surfaces of the oxygen side electrodes 71 of the generators 11 at the time of generation of an electromotive force; however, such moisture can be desirably removed because the oxygen side electrodes are opened to atmosphere through the large opening portions 111. The above-described power emergence piece 114, which is to be disposed so as to project from the electrode extraction groove 48 of the lower housing body 15 (see FIG. 5C), is formed as a rectangular piece extending in the longitudinal direction of the fuel cell card 10 on the upper oxygen side current collector 16 at a position corresponding to that of the electrode extraction groove 48. A projecting portion 113 for positioning and holding the upper oxygen side current collector 16 is formed at a side edge of the upper oxygen side current collector 16 by making effective use of a dead space on the depth side of the hydrogen piping portion. It is to be noted that the upper oxygen side current collector 16 may be made from a conductive plastic containing a carbon material, of a metal film formed on a supporting member.

In an embodiment, the hydrogen supply portion 13 having the hydrogen side current collectors 82 and 81 is disposed, as shown in FIGS. 7A to 7C, such that the back surface of the hydrogen side current collector 82 and the front surface of the hydrogen side current collector 81 are opposed to each other, and the generators 11 and 12 are disposed so as to be stuck on the front surface of the hydrogen side current collector 82 and the back surface of the hydrogen side current collector 81, respectively. Accordingly, the generators 11 and 12 are stuck, from above and below, on the common gas supply portion, that is, the hydrogen supply portion 13, with a result that the power generation area of the generators 11 and 12 can be increased. Also, since the two sets of insulating films 83 and 84 are held as the spacer between the hydrogen side current collectors 82 and 81, hydrogen as a fuel gas can be certainly supplied, through an opening formed in the spacer, to the flat-plate shaped generators 11 and 12 that are stuck on the outer sides of the hydrogen side current collectors 82 and 81, respectively. In particular, if each of the insulating films 83 and 84 is made from a synthetic resin such as polycarbonate or the like, such an insulating film can function as an elastic member, which is elastically deformed to cause uniform contact between the pair of flat-plate shaped generators 11 and 12 and the current collectors 82 and 81 when the generators 11 and 12 are brought into press-contact with the hydrogen side current collectors 82 and 81, respectively. As a result, it is possible to easily obtain the uniform press-contact states between the generators 11 and the upper hydrogen side current collector 82 and between the generators 12 and the lower hydrogen side current collector 81.

In each of the generators 11 and 12, as shown in FIGS. 6A to 6D, the large hole 75 formed in the seal material 74 is fitted to the outer peripheral edge of the hydrogen side electrode 73 smaller than the proton conductor film 72, and the oxygen side electrode 71 side is basically opened to atmosphere via the large opening portions of the oxygen side current collector stuck on the oxygen side electrode 71, and therefore, it does not require any gas seal. This is advantageous in reducing the number of parts and the number of assembling steps. Also, since the seal material 74 having elasticity is contracted in the thickness direction when the current collector is pressed to the generator, to realize uniform contact between the current collector and both the seal material 74 and the hydrogen side electrode 73 inside the seal material 74, thereby improving electrical characteristics of the fuel cell. In addition, since no seal material is present on the oxygen side electrode 71 side, the rigidity of the oxygen side electrode 71 can be ensured because the oxygen side electrode 71 is not affected by characteristics of the seal material. As a result, it is possible to significantly improve the gas-tightness characteristic of the generator.

In the fuel cell card 10 according to this embodiment, since the oxygen side electrodes of the generators 11 and 12 are opened to atmosphere, oxygen can be supplied to the generators 11 and 12 without lowering of a pressure, that is, a partial pressure of oxygen in air. Although moisture is produced on the surfaces of the oxygen side electrodes of the generators 11 and 12 at the time of generation of an electromotive force, such moisture can be desirably removed because the oxygen side electrodes are opened to atmosphere through the large opening portions of the current collectors stuck on the oxygen side electrodes.

As shown in FIG. 2, the fuel cell card 10 according to this embodiment can be inserted in the card insertion slot 22 of the notebook-size personal computer 21 as the apparatus main body and be mounted to the notebook-side personal computer 21. In particular, by using the fuel cell card 10 having the same size as the standardized PC card size for portable equipment, it is possible to prolong the service time of the portable equipment. In this case, although a plurality of the generators 11 and 12 are disposed in the housing of the PC card, oxygen can be supplied to the oxygen side electrodes 71 of the generators with a sufficient pressure because the oxygen side electrodes 71 are opened to atmosphere, with a result that it is not required to provide any gas supply means such as a gas cylinder, a pump or the like. As a result, it is possible to realize space-saving in the fuel cell, and to eliminate the need of provision of any additional auxiliary device.

Figure 15:
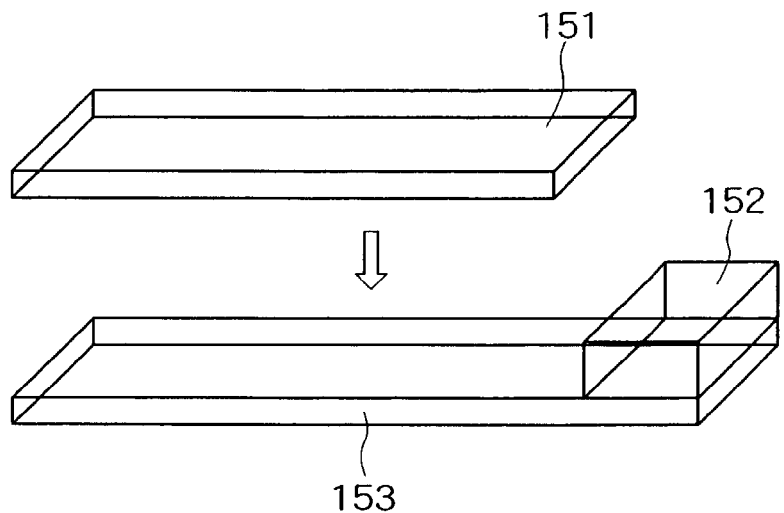
FIG. 15 is a schematic perspective view of an embodiment of the fuel cell of the present invention.
Figure 16:
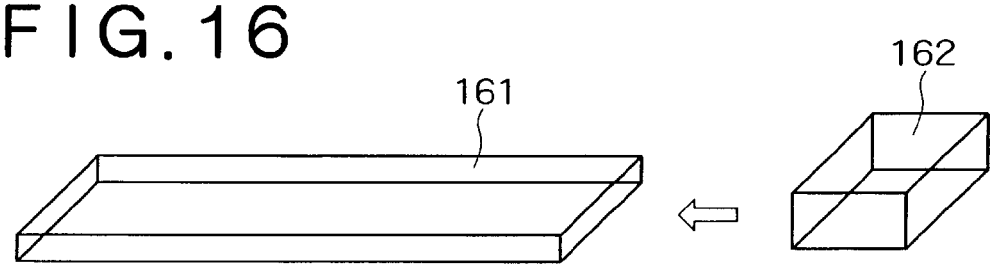
FIG. 16 is a schematic perspective view of an embodiment of the fuel cell of the present invention.
Figure 17:
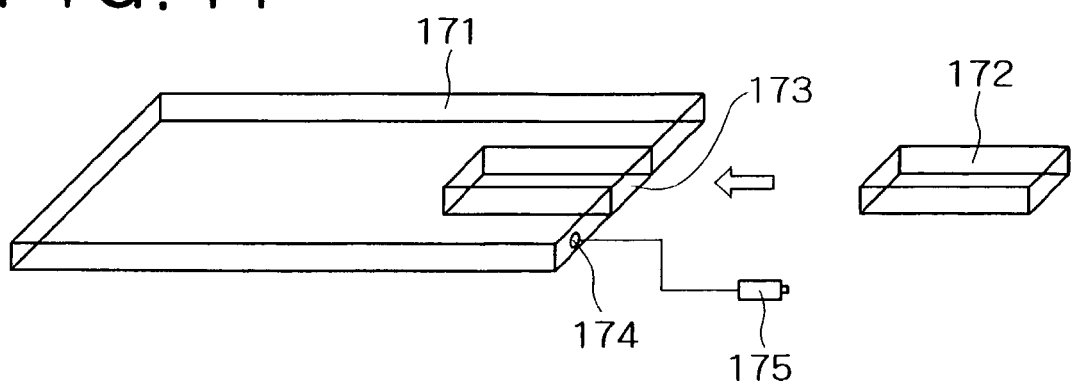
FIG. 17 is a schematic perspective view of an embodiment of the fuel cell of the present invention.

FIGS. 15 to 17 show modifications of the fuel cell card according to this embodiment. In a fuel cell card system as one modification shown in FIG. 15, a fuel cell card 151 has a size (thickness: 3.3 mm) within the above-described range of the size of Type I standardized under the JEIDA/PCMCIA standard. The fuel cell card 151 has the same inner structure as that of the above-described fuel cell card 10. The fuel cell card 151 is connectable to a card type hydrogen storage portion composed to a combination of a plate-like member 153 and a rectangular member 152. When the fuel cell card 151 is connected to the card type hydrogen storage portion, the total of the thickness of the fuel cell card 151 and the thickness of the plate-like member 153 of the card type hydrogen storage portion is specified to be within the above-described range (about 5 mm or less) of Type II standardized under the JEIDA/PCMCIA standard. The fuel cell card 151 configured as described above is mountable to various kinds of notebook-size personal computers. The card type hydrogen storage portion, which has a large hydrogen gas storage volume equivalent to the total of volumes of the plate-like member 153 and the rectangular member 152, allows a long time service of the fuel cell card 151.

FIG. 16 shows a fuel cell card system of a PC card type as another modification according to an embodiment of the present invention. A fuel cell card 161 is connectable to a hydrogen storage portion 162 having a thickness size. The fuel cell card 161 has the same inner structure as that of the above-described fuel cell card 10. The hydrogen storage portion 162 is removably mounted to the fuel cell card 161. Since the hydrogen storage portion 162 is thicker than the hydrogen storage stick 18 described in the previous embodiment, it allows a longer time service of the fuel cell card 161.

FIG. 17 shows a fuel cell 171 as a further modification, which has the same size as that of a housing such as a removable disc according to an embodiment of the present invention. A hydrogen storage stick 172 for supplying hydrogen is insertable in a slot 173 provided in one end portion of the fuel cell 171. An output terminal 174 for outputting an electromotive force of the fuel cell 171 is formed at a front edge of the fuel cell 171, and a power supply plug 175 extending from the output terminal 174 is connectable to an apparatus main body such as a personal computer, to operate the apparatus main body by using the fuel cell 171.

The shapes of the insulating films 83 and 84 of each of the generators 11 and 12 in the previous embodiment can be modified into those shown in FIGS. 18A to 18E. FIG. 18A shows an insulating film example having the same shape as the combined shape of the insulating films 83 and 84 in the previous embodiment. This example is comprised of an insulating film 180 made from polycarbonate, in which an approximately rectangular fuel passage 181 is formed. FIG. 18B shows another insulating film example comprised of an insulating film 182, which is different from the insulating film 180 shown in FIG. 18A in that two left projections 184 and two right projections 184 are provided in a fuel passage 183 in such a manner as to project in the direction perpendicular to the flow direction of oxygen from a fuel inlet. With this configuration, since the opposed hydrogen side electrodes stuck on both sides of the insulating film 182 can be supported not only by the peripheral portion of the insulating film 184 but also by the projections 184, it is possible to enhance the insulation between the pair of opposed flat-plate shaped hydrogen side electrodes while ensuring the fuel passage 183. FIG. 18C shows a further insulating film example comprised of an insulating film 185, which is different from the insulating film 182 shown in FIG. 18B in that two left projections 187 and two right projections 187 are provided in a fuel passage 186 in such a manner as to project in the direction parallel to the flow direction of oxygen from a fuel inlet. Even with this configuration, since the opposed hydrogen side electrodes stuck on both sides of the insulating film 185 can be supported not only by the peripheral portion of the insulating film 185 but also by the projections 187, it is possible to enhance the insulation between the pair of opposed flat-plate shaped hydrogen side electrodes while ensuring the fuel passage 186.

FIG. 18D shows a further insulating film example comprised of an insulting film 188 extending in the form of a rectangular closed strip and a circular insulating portion 190 formed at an approximately central portion of a fuel passage 189 formed by the rectangular strip-shaped insulating film 188. With this configuration, since fuel such as hydrogen gas or methanol is diffused in the fuel passage 189 along the circular insulating portion 190, it is possible to enhance an electromotive force of the fuel cell. FIG. 18E shows a further insulating film example comprised of an insulating film 191 extending in the form of a rectangular closed strip and a plurality (five in this example) of circular insulating portions 193 formed at an approximately central portion of a fuel passage 192 formed by the rectangular strip-shaped insulating film 191. With this configuration, fuel such as hydrogen gas or methanol can be desirably diffused in the fuel passage 192 along the circular insulating portions 193.

The flow passage configurations of the insulating films 83 and 84 of each of the generators 11 and 12 in the previous embodiment can be modified into those shown in FIGS. 19A to 19C. FIG. 19A shows an insulating film example having the same shape as the combined shape of the insulating films 83 and 84 described in the previous embodiment. This example is comprised of an insulating film 195 made from polycarbonate, which has at its central portion an approximately rectangular fuel passage having an inlet 195e and an outlet 195f. Excess fuel can be discharged from the outlet 195f. FIG. 19B shows another insulating film example having no leak hole such as the outlet 195f shown in FIG. 19A. This example is comprised of an insulating film 196 extending in the form of a rectangular closed strip, which has at its central portion an approximately rectangular flow passage having only an inlet 196e. FIG. 19C shows a further insulating film example comprised of an insulating film 197 made from polycarbonate. The insulating film 197 extends in the form of an approximately rectangular closed strip, which has at its central portion an approximately rectangular flow passage having an inlet 197e and an outlet 197f, wherein a valve 198 is formed on the flow-out side of the outlet 197f. When the inner pressure of fuel such as hydrogen becomes excessively high, the valve 198 is opened to lower the inner pressure, and when the inner pressure of fuel is within an optimum range, the valve 198 is kept as closed for preventing waste leakage of the fuel.

[Second Embodiment]

A second embodiment of the approximately flat-plate shaped card type fuel cell of the present invention will be described below with reference to FIGS. 20 to 27. The card type fuel cell according to this embodiment is mainly characterized in that fans driven by motors are provided as air flow inducing means on both side portions of the card type fuel cell, and a plurality of grooves are provided inside a housing as air passages for guiding air, which has been fed as an oxygen side fuel by the fans, onto the surfaces of generators.

Figure 21A:
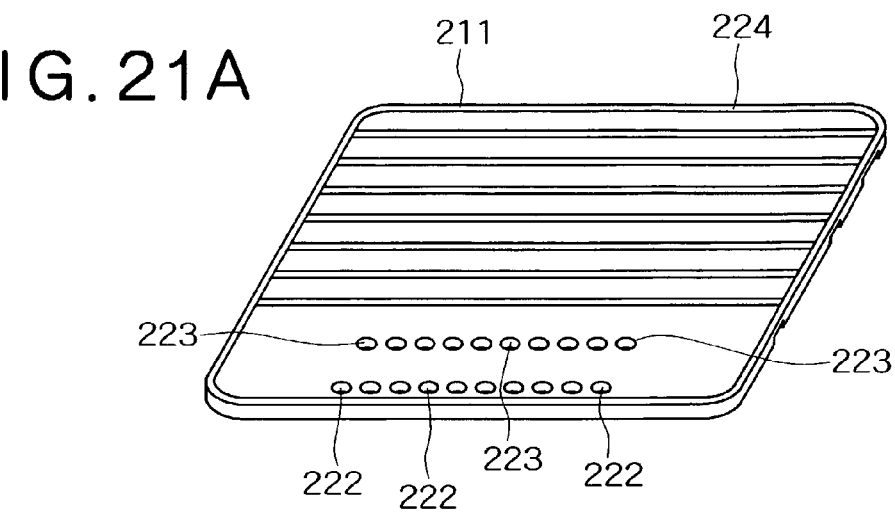
Figure 21B:
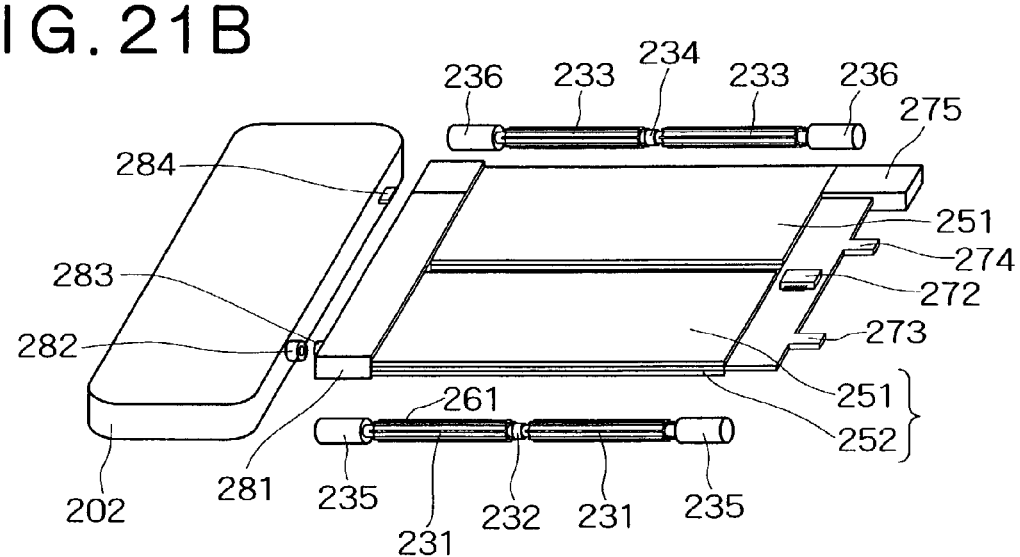
Figure 21C:
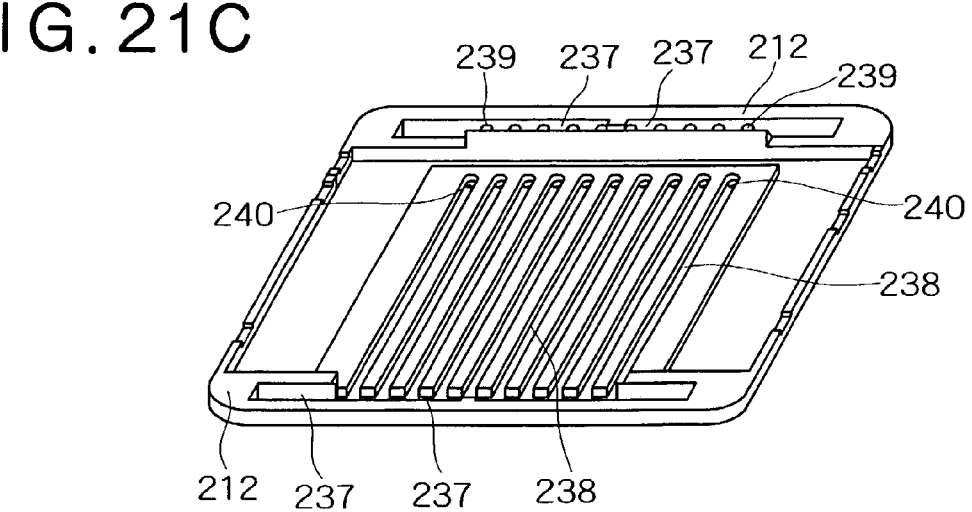
Figure 22:
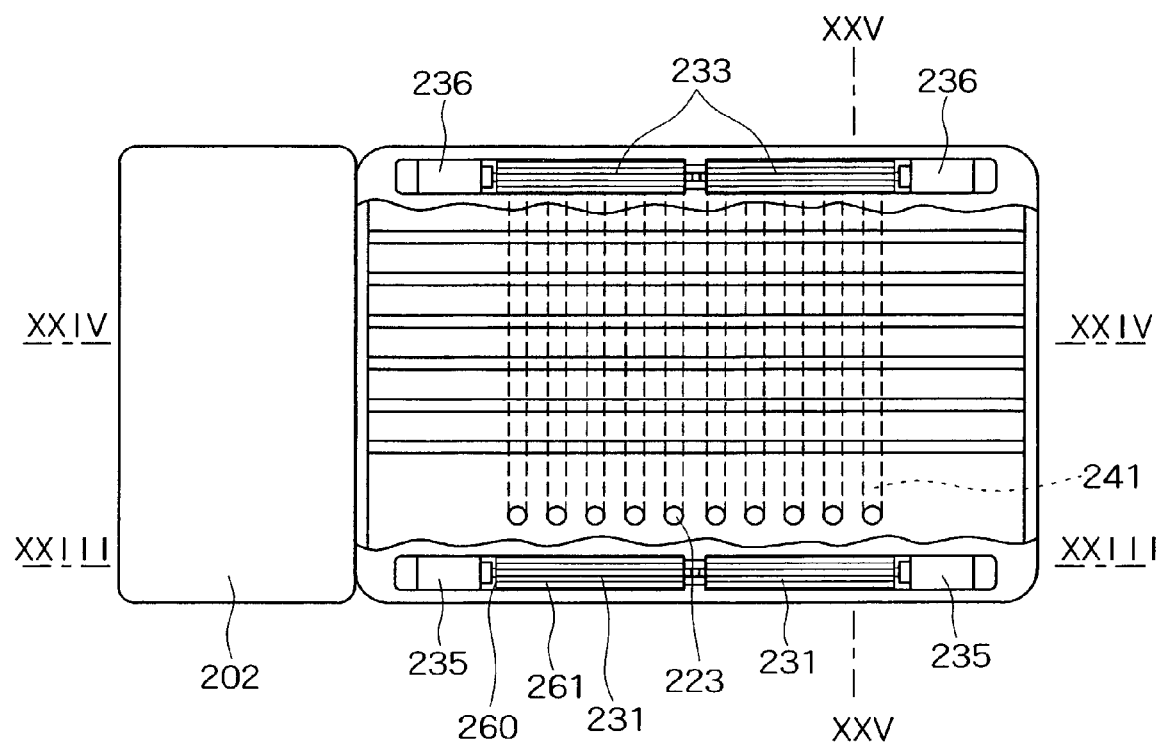
FIG. 22 is a plan view, with parts partially cutaway, showing the fuel cell according to an embodiment of the present invention.
Figure 23:
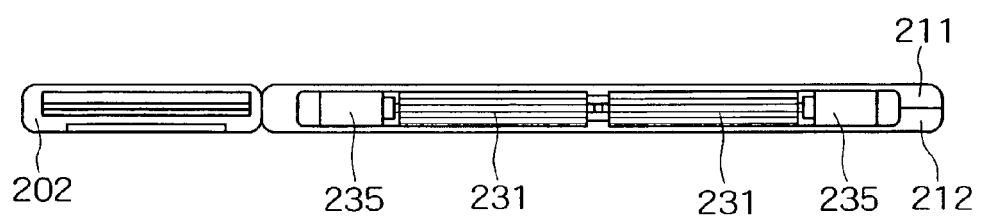
FIG. 23 is a sectional view taken on line XXIII—XXIII of FIG. 22, showing the fuel cell according to an embodiment of the present invention.

Referring to FIGS. 21A to 21C, a housing of a card type fuel cell 201 according to this embodiment includes an upper housing body 211 and a lower housing body 212, each of which is molded from a synthetic resin material having specific rigidity, heat-resistance, and acid-resistance. The upper housing body 211 is superimposed on the lower housing body 212, to form the housing of an approximately flat-plate card shape. The housing of the card type fuel cell may be, for example, sized to satisfy a standardized size of a housing of a PC card standardized under the JEIDA/PCMCIA standard. The standardized size of the housing under the JEIDA/PCMCIA standard is defined such that a longitudinal dimension (long side) of the housing is in a range of 85.6 mm±0.2 mm and a lateral dimension (short side) of the housing is in a range of 54.0 mm±0.1 mm. The thickness of the card is also standardized under the JEIDA/PCMCIA standard for each of Type I and Type II as follows: namely, for Type I, the thickness of a connector portion of the card is in a range of 3.3 mm±0.1 mm and the thickness of a base portion of the card is in a range of 3.3 mm±0.2 mm, and for Type II, the thickness of the connector portion of the card is in a range of 3.3 mm±0.1 mm and the thickness of the base portion of the card is in a range of 5.0 mm or less and a standard thickness of the base portion ±0.2 mm. According to this embodiment, with respect to the size of the housing as the cell main body, which is formed by superimposing the upper housing body 211 on the lower housing body 212, the size of the cell main body in a state that any additional element is not mounted to the cell main body may be set to satisfy the standardized size under the JEIDA/PCMCIA standard, or the size of the cell main body in a state after a hydrogen storage cartridge 202 is joined to the cell main body as will be described later may be set to satisfy the standardized size under the JEIDA/PCMCIA standard. Alternatively, according to this embodiment, the size of the cell main body in a state after an adapter or the like is combined with the cell main body may be set to satisfy the standardized size under the JEIDA/PCMCIA standard.

A row of opening portions 222 and a row of opening portions 223 are formed in a side portion, extending along one long side, of the rectangular upper housing body 211. The opening portions 222 and 223 are through-holes passing through the upper housing body 211 in the thickness direction, and are taken as air inlets and air outlets for sucking or discharging air in or from the housing. In this embodiment, the opening portions 222 and 223 are formed into circular shapes; however, they may be formed into elliptic, rectangular, or polygonal shapes. A plurality of grooves 224, which are to be used as non-slip means when the housing is gripped by a user's hand, are formed in the outer surface of the upper housing body 211.

Figure 24:
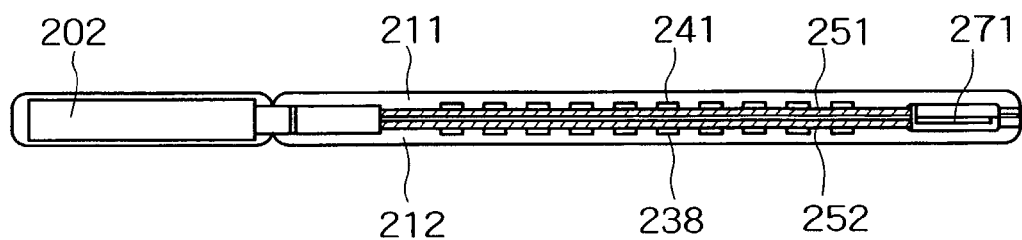
FIG. 24 is a sectional view taken on line XXIV—XXIV of FIG. 22, showing the fuel cell according to an embodiment of the present invention.
Figure 25:
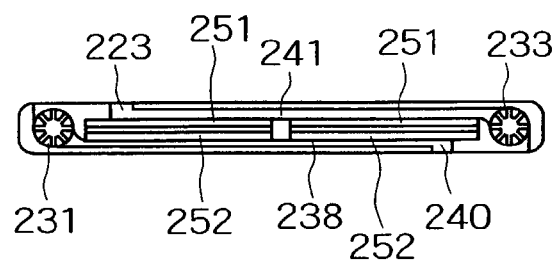
FIG. 25 is a sectional view taken on line XXV—XXV of FIG. 22, showing the fuel cell according to an embodiment of the present invention.
Figure 26:
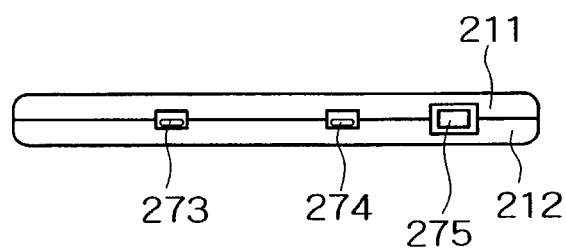
FIG. 26 is a side view of the fuel cell according to an embodiment of the present invention, showing the output terminal side thereof.
Figure 27:
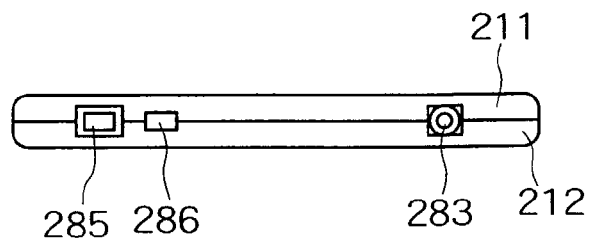
FIG. 27 is a side view of the fuel cell according to an embodiment of the present invention, showing the hydrogen storage cartridge side thereof.

As shown in FIG. 24, a plurality of grooves 241 are in parallel formed in the inner surface of the upper housing body 211 in such a manner as to extend nearly in lines in the lateral direction of the upper housing body 211, more concretely, from positions of fans 233 disposed along one long side of the approximately rectangular upper housing body 211 to the vicinities of positions of fans 231 disposed along the other long side of the upper housing body 211 (see FIG. 21B). The fans 233 and 231 constitute air flow inducing member and the grooves 241 constitute air passages. Each of the grooves 241 is formed into an approximately U-shape in cross-section. In the upper housing body 211, the grooves 241 are continuous to a fan space portion 237 formed so as to surround the fans 233. The fan space portion 237 is formed into an approximately rectangular shape extending along the long side of the upper housing body 211, and the approximately cylindrical fans 233 are housed in the fan space portion 237 with a specific gap put therebetween. In addition to the fan space portion 237 on the fan 233 side, a fan space portion 237 on the fan 231 side is formed into an approximately rectangular shape extending along the long side of the upper housing body 211, and the approximately cylindrical fans 231 are housed in the fan space portion 237 with a specific gap put therebetween. In the upper housing body 211, the fan space portion 237 on the fan 231 side are positioned directly under the outer side opening portions 222 formed in the upper housing body 211, wherein air led from the opening portions 222 is controlled to flow in grooves (described below) provided inside the housing by the fans 231. In this embodiment, the air led from the opening portions 222 are guided in grooves 238 formed in the lower housing body 212 by the fans 231. Meanwhile, the air passing through the grooves 241 formed in the upper housing body 211 is introduced by the fans 233 through opening portions 239 as air inlets that are formed in the vicinity of the long side edge of the lower housing body 212 in such a manner as to be opened to atmosphere.

The lower housing body 212 is a member paired with the upper housing body 211 to form the card shaped housing. Like the upper housing body 211, as shown in FIG. 21C, a plurality of the above-described grooves 238 are formed in parallel in the inner surface of the lower housing body 212 in such a manner as to extend nearly in lines in the lateral direction of the lower housing body 212 from a position of the fan space portion 237 for housing the fans 231 extending along the long side of the approximately rectangular lower housing body 212 to the vicinity of a position of the fan space portion 237 for housing the fans 233 extending along the other long side of the lower housing body 212. Each of the grooves 238 is formed into an approximately U-shape in cross-section. In the lower housing body 212, the grooves 238 are continuous to the fan space portion 237 on the fan 231 side. The grooves 238 are terminated in the vicinities of the fans 233 opposed to the fans 231 and are communicated to the outside of the housing via opening portions 240 provided at the terminals of the grooves 238. In the lower housing body 212, the fan space portion 237 on the fan 233 side is positioned directly over the above-described opening portions 239 formed in the lower housing body 212 in such a manner as to be opened to atmosphere, wherein air led from the opening portions 239 is controlled to flow in the grooves 241 formed in the inner surface of the upper housing body 211 by the fans 233.

The grooves are formed in the inner surfaces of the upper and lower housing bodies 211 and 212 in such a manner as to extend in the direction perpendicular to the long sides of the housing bodies 211 and 212 as described above, and a pair of generators 251 and 252 and another pair of generators 251 and 252 are adjacently disposed inside the housing bodies 211 and 212 in a state being in contact with the inner surfaces (provided with the grooves) of the housing bodies 211 and 212. In this embodiment, the pair of the generators 251 and 252 are combined into one body as follows: namely, the upper side generator 251 is superimposed to the lower side generator 252 such that a pair of hydrogen side electrodes (or a common hydrogen electrode) on the inner sides of the generators 251 and 252 are held between oxygen side electrodes on the outer sides of the generators 251 and 252. Since the hydrogen side electrodes of the generators 251 and 252 are located on the center side of the combined body of the pair of generators 251 and 252, gaseous fuel such as hydrogen based fuel, methanol based fuel, or borohydride based fuel, or liquid fuel can be readily supplied to the hydrogen side electrodes of the combined body of the pair of generators 251 and 252. Also, since the hydrogen side electrodes are located on the center side of the combined body of the pair of generators 251 and 252, the oxygen side electrodes are located on the front and back surfaces of the combined body of the pair of generators 251 and 252. In other words, the combined body of the pair of generators 251 and 252 formed into approximately flat-plate shapes is surrounded by the oxygen side electrodes. Accordingly, it is possible to enhance the effective area for power generation of the fuel cell.

The power generation mechanism of each of the pair of generators 251 and 252 will be described below according to an embodiment of the present invention. The generator includes a proton conductor film as an electrolyte film, a hydrogen side electrode formed on one side of the proton conductor film, and an oxygen side electrode formed on the other side of the proton conductor film. A fuel fluid such as hydrogen gas is supplied from an external source to the hydrogen side electrode. The fuel fluid passes through pores in the hydrogen side electrode, to reach a reaction region. In the reaction region, the hydrogen gas is adsorbed in catalyst contained in the hydrogen side electrode to be converted into active hydrogen atoms. The active hydrogen atoms become hydrogen ions, which migrate to the oxygen side electrode as a counter electrode, and at the same time, electrons generated upon ionization are transmitted to the hydrogen side electrode. These electrons pass through a circuit connected to an external terminal, to reach the oxygen side electrode, thereby causing an electromotive force.

Each of the oxygen side electrode and the hydrogen side electrode of the generator is formed by a metal plate, or a plate made from a porous metal material or a conductive material such as a carbon material. Current collectors are connected to these oxygen side electrode and the hydrogen side electrode. The current collector is an electrode material for emergence of an electromotive force generated by the electrodes, and is made from a metal material, a carbon material, or a non-woven fabric having conductivity. Each of the generators 251 and 252 having the structure that the electrolyte film is held between the oxygen side electrode and the hydrogen side electrode is called "MEA (Membrane and Electrode Assembly). In particular, according to this embodiment, the pair of generators 251 and 252 are combined into one body in such a manner as to be superimposed to each other with the hydrogen side electrodes directed inwardly and as a consequence the oxygen side electrodes are located on the front and back surfaces of the combined body of the pair of generators 251 and 252. In this embodiment, each of the generators 251 and 252 is formed into an approximately rectangular shape longer in the direction along the long sides of the card shaped housings 211 and 212. The size of the short side of each of the generators 251 and 252 is set to a value obtained by subtracting sizes of peripheral members such as the fans 231 and 233 as the air flow inducing means from an about half of the size of the short side of each of the card shaped housings 211 and 212. Accordingly, in the fuel cell of this embodiment, two combined bodies, each having the pair of generators 251 and 252, are disposed in parallel in the horizontal direction. By connecting such four generators 251 and 252 in series, a high electromotive force can be obtained, and by connecting such four generators 251 and 252 in parallel, the working time of the fuel cell can be prolonged.

In the fuel cell according to this embodiment, each generator is formed into the shape equivalent to that of one of the two-divided parts of the card shaped housing in the direction along the short side of the housing; however, it may be formed into a shape equivalent to that of one of two-divided parts of the card shaped housing in the direction along the long side of the housing. The number of the generators is not limited to four but may be set to six, eight, or more. Also, according to this embodiment, the shapes of the generators are set to be identical to each other. This is advantageous in facilitating the production of the generators by mounting the same generators. According to the present invention, however, generators having different shapes may be combined with each other. For example, a generator having a large size and a generator having a small size may be disposed within the same plane, or a generator having a large thickness and a generator having a small thickness may be disposed within the same plane. Alternatively, generators of different kinds in performance such as capacity or efficiency may be combined and mounted in a housing. In this embodiment, each of the generators 251 and 252 is set to have a specific rigidity; however, it may be set to have a flexibility. In this case, a housing may be made from a flexible material. Also, the generator may be of a replaceable cartridge type, and be of a movable type in which the generator is slid in a housing so as to change the connection form between the generators.

The fans 231 and 233 as the air flow inducing means will be described below. According to this embodiment, the pair of fans 231 have a cylindrical rotational shaft 260 located on the center side, and similarly the pair of fans 233 have a cylindrical rotational shaft 260 located on the center side. For each of the fans 231 and 233, eight vane portions 261 are mounted on the rotational shaft 260 in such a manner as to project radially therefrom and to be spaced from each other at specific intervals in the circumferential direction. Each of the vane portions 261 is formed into a rectangular shape longer in the axial direction of the rotational shaft 260. The leading end of the vane portion 261 is separated from the inner wall of the fan space portion 237 as a cutout portion of each of the upper and lower housing bodies 211 and 212 with a slight clearance put therebetween. Referring to FIG. 21B, the fans 231 are disposed, on the front side of the figure, in the vicinities of side edges of the housing bodies 211 and 212 in such a manner as to extend along the long sides of the housing bodies 211 and 212, and the fans 233 are disposed, on the depth side of the figure, in the vicinities of side edges of the housing bodies 211 and 212 in such a manner as to extend along the long sides of the housing bodies 211 and 212. With this disposition of the fans 231 and 233, it is possible to ensure a large area of each of the electrodes of the generators. The pair of fans 231 are disposed, on the front side of the figure, along the long sides of the housing bodies 211 and 212, and the pair of fans 233 are disposed, on the depth side of the figure, along the long sides of the housing bodies 211 and 212. Accordingly, the fans 231 and 233 of the four pieces in total are disposed for the fuel cell. The pair of fans 231 are driven by two independent motors 235, respectively, and the pair of fans 233 are driven by two independent motors 236, respectively. The pair of fans 231 are disposed coaxially with each other, and the rotational shaft 260 of the fans 231 is supported by a common bearing 232. Similarly, the pair of fans 233 are disposed coaxially with each other, and the rotational shaft 260 of the fans 233 is supported by a common bearing 234. Each of the motors 235 and 236 is configured as a micro DC motor having a diameter being nearly equal to that of the fans 231 and 233. Each of the motors 235 and 236 is fixedly supported by an end portion of the fan space portion 237 as the cylindrical cutout portion. A current is supplied to each of the motors 235 and 236 via wiring (not shown); however, part of an electromotive force generated in the fuel cell may be given as a rotational force of each of the motors 235 and 236. The drive circuit for the motors 235 and 236 is configured as an electronic part 272 such as an integrated circuit mounted on a wiring board 271 disposed in the housing bodies 211 and 212.

The fans 231 and 233 configured as described above can be rotated by supplying a power to the motors 235 and 236. Part of an electromotive force generated in the fuel cell, that is, from the generators 251 and 252 can be used as a power supplied to the motors 235 and 236. When the fans 231 or 233 are rotated around their axes, air around the vane portions 261 in the fan space portion 237 is made to flow along the rotational direction of the fans 231 or 233. The fan space portion 237 on the fan 231 side, as described above, is continuous to the plurality of grooves 238 formed in the inner surface of the lower housing body 212, so that along with the rotation of the fans 231, the air in the fan space portion 237 is pushed in the grooves 238 of the lower housing body 212. On the other hand, the fan space portion 237 on the fan 233 side is, as described above, is continuous to the plurality of grooves 241 formed in the inner surface of the upper housing body 211, so that along with the rotation of the fans 233, the air in the fan space portion 237 is pushed in the grooves 241 of the upper housing body 211. Along with the pushing action of the air from the fan space portion 237 in the grooves, there occurs a sucking action of air in each fan space portion 237. In this regard, the fan space portion 237 on the fan 231 side sucks air from the opening portions 222 formed in the upper housing body 211, and the fan space portion 237 on the fan 233 side sucks air from the opening portions 239 formed in the lower housing body 212.

Air is supplied in the grooves 241 formed in the upper housing body 211 in such a manner as to extend in the direction perpendicular to the side surfaces of the upper housing body 211. Similarly, air is supplied in the grooves 238 formed in the lower housing body 212 in such a manner as to extend in the direction perpendicular to the side surfaces of the lower housing body 212. Three sides of the cross-section of each of the grooves 241 are surrounded by the upper housing body 211 but the remaining lower side thereof is opened downwardly. The upper surface of the upper side generator 251 is thus directly exposed to the thus opened lower side of the grooves 241. Since air flows in the grooves 241 by the drive of the fans 233, water liable to remain on the oxygen side electrode on the upper surface of the upper side generator 251 can be removed by evaporation due to the air flowing on the oxygen side electrode by the fans 233. Similarly, three sides of the cross-section of each of the grooves 238 are surrounded by the lower housing body 212 but the remaining upper side thereof is opened upwardly. The bottom surface of the lower side generator 252 is thus directly exposed to the thus opened upper side of the grooves 238. As a result, since air flows in the grooves 238 by the drive of the fans 231, water liable to remain on the oxygen side electrode on the bottom surface of the lower side generator 252 can be removed by evaporation due to the air flowing on the oxygen side electrode by the fans 231. The air having passed through the grooves 241 is discharged to the outside of the housing via the opening portions 223 provided at the terminals of the grooves 241, and the air having passed through the groove 238 is discharged to the outside of the housing via the opening portions 240 formed at the terminals of the grooves 238. At this time, the moisture produced on the surfaces of the generators 251 and 252 are simultaneously discharged to the outside of the fuel cell. Accordingly, moisture produced at the time of supplying a power as the fuel cell can be efficiently discharged to the outside of the fuel cell.

According to this embodiment, the grooves 238 and 241 functioning as air passages are formed into the plurality of parallel line shapes; however, they may be formed into shapes having a wave pattern such as a sine wave pattern or a rectangular wave pattern, or a spiral or U-shaped plane pattern. Although the plurality of grooves are provided in this embodiment, a single groove may be provided. The grooves are not necessarily identical to each other in terms of size and length. The grooves may be sized such that the flow rate of air at a portion where moisture is liable to be produced is increased. The groove may be entirely hollowed as described in this embodiment, or a water absorbing member may be provided in part of the groove. In this embodiment, one opening portion used as an air inlet or an air outlet is provided for each groove; however, a plurality of opening portions used as air inlets or air outlets may be provided for each groove. A net or a shutter mechanism for preventing permeation of dust or the like in the housing may be provided for the opening portion of the groove. In this embodiment, the grooves 238 or 241 are provided on the inner surface of the housing body; however, a separate member including the grooves may be held between the generator and the housing body. In addition, air passages may be provided on the generator side. The air passages may be formed by providing a member made from a fiber material or non-woven fabric having permeability, or a porous material.

In addition to the above-described generators 251 and 252, fans 231 and 233, and motors 235 and 236, a fuel flow rate adjusting portion 281 is provided in the fuel cell 201 according to this embodiment. The fuel flow rate adjusting portion 281 functions as an interface portion with a hydrogen storage cartridge 202 of the card shaped fuel cell 201, and has a mechanism for efficiently supplying a fuel fluid from the hydrogen storage cartridge 202 to the generators 251 and 252 while adjusting the amount of the fuel fluid to a suitable value. More specifically, the fuel flow rate adjusting portion 281 has a connecting portion 283 connectable to a fuel outlet 282 of the hydrogen storage cartridge 202. A valve body (not shown) continuous to the connecting portion is provided in the fuel flow rate adjusting portion 281 for supplying a fuel at a specific pressure to the space between the generators 251 and 252. The fuel flow rate adjusting portion 281 may include a monitoring portion for monitoring a connection state between the fuel outlet 282 of the hydrogen storage cartridge 202 and the connecting portion 283, a pressure measuring portion for measuring the pressure of the fuel from the hydrogen storage cartridge 202, a temperature detecting portion for detecting temperatures of the fuel cell 201 and the hydrogen storage cartridge 202, and a fuel leakage preventing mechanism portion. For example, if it is decided that the pressure is excessively high on the basis of data from the pressure measuring portion, the valve body may be controlled to be closed, and if it is decided that the pressure is excessively low on the basis of data from the pressure measuring portion, the valve body may be controlled to be opened. Such control can be performed by monitoring the state of the hydrogen storage cartridge 202 via an I/O portion 285. The I/O portion 285 is disposed in the vicinity of a fitting portion 286 to be fitted to a connecting projection piece 284 of the hydrogen storage cartridge 202. The I/O portion 285 allows data communication of a similar I/O portion of the hydrogen storage cartridge 202. A similar I/O portion 275 is also provided on the output side for detecting the state of the consumption side of an output power of the fuel cell 201, thereby controlling the output. For example, if the power consumption of an apparatus on the consumption side of an output power is changed depending on an active state, a sleep state, a soft-off state, and a stand-by state of the apparatus, the output control of the fuel cell can be performed on the basis of the state of the power consumption of the apparatus.

The wiring board 271 is, as described above, provided in the fuel cell 201 according to this embodiment. The rotational speed and the turn-on/turn-off of each of the motors 235 and 236 can be controlled and also the output voltage of the fuel cell 201 can be adjusted by the electronic part 272 and the like mounted on the wiring board 271. A power can be supplied to an apparatus connected to the fuel cell 201 by outputting an electromotive force from terminals formed on projection pieces 273 and 274 of the wiring board 271.

The hydrogen storage cartridge 202 connected to the fuel flow rate adjusting portion 281 is a member containing a hydrogen storage alloy. The hydrogen storage cartridge 202 is removably mounted to the housing of the fuel cell 201. When the hydrogen storage cartridge 202 is mounted to the housing of the fuel cell 201, a fuel fluid is made to flow by connecting the fuel outlet 282 to the connecting portion 283. Meanwhile, when the hydrogen storage cartridge 202 is removed from the housing of the fuel cell 201, the flow-out of fuel fluid from the hydrogen storage cartridge 202 is stopped. The hydrogen storage cartridge 202 has a thickness nearly equal to that of the card shaped fuel cell 201 and has a short-side size nearly equal to that of the card shaped fuel cell 201. As a result, when the hydrogen storage cartridge 202 is connected to the fuel cell 201, they form an integral card body extending in the longitudinal direction. Such an integral card body is easy to handle. In this embodiment, the hydrogen storage cartridge 202 has a thickness nearly equal to that of the card shaped fuel cell 201 and has a short-side size nearly equal to that of the card shaped fuel cell 201, the present invention is not limited thereto. The hydrogen storage cartridge 202 may have a shape which is different from that described above, for example, which is thicker than that described above. A plurality of hydrogen storage cartridges to be connectable to the fuel cell may be provided. Further, a plurality of connecting portions may be provided, and in this case, a signal transmission means and the like may be disposed at the connecting portions or their neighborhoods.

In an embodiment, the grooves 238 and 241 are formed in the housing bodies 212 and 211 as the air passages in such a manner as to face to the surfaces of the oxygen side electrodes of the generators 251 and 252. Accordingly, moisture produced on the oxygen side electrodes is evaporated by air led in the grooves 238 and 241 by the fans 231 and 233. The evaporated moisture is entrapped in the air and is then discharged to the outside of the housing via the opening portions 223 and 240. As a result, it is possible to control the amount of moisture produced in the fuel cell to a suitable value, and hence to facilitate a power. In the case of evaporating moisture produced on the oxygen side electrodes by air naturally flowing in the fuel cell, there arises a problem that the evaporation rate of moisture is largely affected by the natural convection state, the temperature of outside air, the humidity, the sizes of the opening portions, and the like. According to the fuel cell 201 in this embodiment, however, the air passing on the surfaces of the oxygen side electrodes has been forcibly supplied by the fans 231 and 233, to stably evaporate moisture as compared with the case of evaporating moisture by air naturally flowing in the fuel cell without use of any air flow inducing means.

The fans 231 and 233 are located, according to this embodiment, in the vicinities of the long side edges of the housing bodies 211 and 212 in such a manner as to extend along the long sides of the housing bodies 211 and 212; however, the present invention is not limited thereto. For example, the fans 231 and 233 may be located in the vicinities of the short side edges of the housing bodies 211 and 212 in such a manner as to extend along the short sides of the housing bodies 211 and 212. Also, the air flow inducing means, which are exemplified by the fans in this embodiment, may be formed in such a manner as to be located between two of a plurality of flat-plate like generators disposed in parallel in the horizontal direction. Each of the card shaped housing bodies 211 and 212, which is made from a specific synthetic resin, metal, glass, ceramic, or fiber-reinforced synthetic resin, is not necessarily formed into a non-deformable body but may be formed into a foldable body, and further, may be configured such that part of the members constituting the housing body may be removably mounted thereto.

Figure 28:
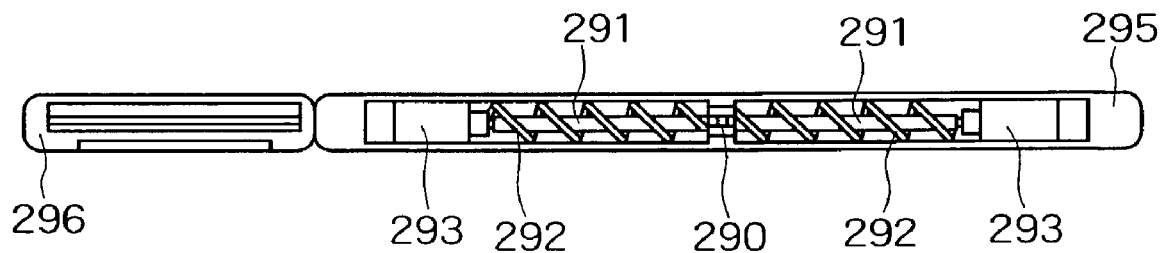
FIG. 28 is a sectional view showing a modification of the fuel cell according to an embodiment of the present invention, wherein a fan is provided with a spiral vane portion.

FIG. 28 is a sectional view illustrating a modification of the fan. In this modification, a pair of fans 291 are disposed in an approximately flat-plate shaped housing 295 connected to a hydrogen storage cartridge 296 in such a manner that rotational shafts 290 thereof are aligned in lines. For each fan 291, a spiral vane portion 292 is formed around the rotational shaft 290. The fan 291 is disposed coaxially with a motor 293 and is rotated around its axis by rotation of the motor 293 so as to feed wind in the axial direction. The pair of fans 291 may be controlled to be rotated in the same direction. Also, inlets of air passages such as grooves may be provided in a common bearing portion for feeding wind in opposed directions.

[Third Embodiment]

Figure 29:
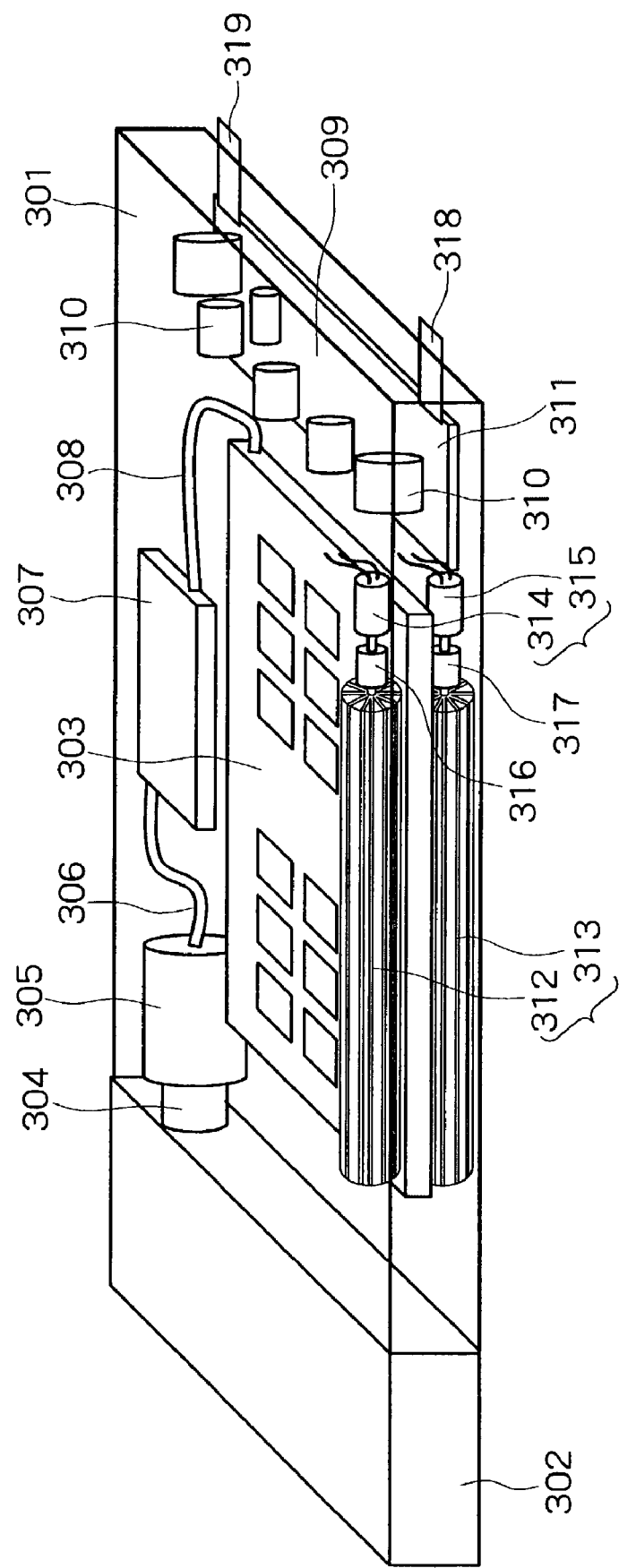
FIG. 29 is a partial perspective view of a fuel cell according to an embodiment of the present invention.

A third embodiment of the fuel cell of the present invention will be described below. In this embodiment, an air flow inducing means using fans is formed on one side surface. Referring to FIG. 29, there is shown an approximately rectangular card shaped housing 301 in which a power generation unit 303 is disposed. The housing 301 of the card type fuel cell may be, for example, sized to satisfy a standardized size of a housing of a PC card standardized under the JEIDA/PCMCIA standard. The standardized size of the housing under the JEIDA/PCMCIA standard is defined such that a longitudinal dimension (long side) of the housing is in a range of 85.6 mm±0.2 mm and a lateral dimension (short side) of the housing is in a range of 54.0 mm±0.1 mm. The thickness of the card is also standardized under the JEIDA/PCMCIA standard for each of Type I and Type II as follows: namely, for Type I, the thickness of a connector portion of the card is in a range of 3.3 mm±0.1 mm and the thickness of a base portion of the card is in a range of 3.3 mm±0.2 mm, and for Type II, the thickness of the connector portion of the card is in a range of 3.3 mm±0.1 mm and the thickness of the base portion of the card is in a range of 5.0 mm or less and a standard thickness of the base portion ±0.2 mm. As described in the previous embodiments, the card shaped housing 301 may be formed by superimposing an upper housing body to a lower housing body.

The hydrogen storage cartridge 302 is sized such that end planes in the direction perpendicular to the longitudinal direction of the card shaped housing 301 has a size nearly equal to that of the corresponding end planes of the card shaped housing 301, and therefore, the hydrogen storage cartridge 302 is continuously connectable to the card shaped housing 301. A hydrogen storage portion such as a hydrogen storage alloy is disposed in the hydrogen storage cartridge 302. The hydrogen storage cartridge 302 is removably mounted to the housing 301 of the fuel cell. When the hydrogen storage cartridge 302 is mounted to the housing 301 of the fuel cell, a fuel outlet of the hydrogen storage cartridge 302 is connected to a connecting portion thereof to allow the flow-out of fuel. On the other hand, when the hydrogen storage cartridge 302 is removed from the housing 301, the flow-out of fuel from the hydrogen storage cartridge 302 is stopped.

The card shaped housing 301 internally includes the power generation unit 303 composed of a combination of four generators, a connecting portion 304 for introducing fuel from the hydrogen storage cartridge 302 in the card shaped housing 301, a power generation side connecting portion 305 in which the connecting portion 304 is to be fixedly inserted, a flow rate adjusting portion 307 connected to the power generation side connecting portion 305 via a pipe 306, a pipe 308 for connecting the flow rate adjusting portion 307 to the power generation unit 303, and a control circuit portion 309 composed of electronic parts 310 mounted on a wiring board 311 for performing output control. A pair of fans 312 and 313 as the air flow inducing means are disposed in the card shaped housing 301 in such a manner as to extend along one side surface of the housing 301. The fans 312 and 313 are rotated by motors 314 and 315, respectively. The fans 312 and 313 are disposed in parallel to each other, and particularly, in this embodiment, the fans 312 and 313 are disposed on the upper and lower sides for feeding air to the generators on the upper side and the generators on the lower side, respectively.

Each of the fans 312 and 313 has a structure that vane portions are provided around a cylindrical rotational shaft. The vane portions, each of which extends in straight line in the axial direction of the rotational shaft, project radially from the rotational shaft. Accordingly, the fans 312 and 313 are rotated around the rotational shafts by the drive of the motors 314 and 315, to feed air in a space in the housing in the direction perpendicular to the rotational shafts along grooves (not shown). As will be described later, the fans 312 and 313 can be used for evaporation of moisture produced on oxygen side electrodes and for radiation of heat by the air fed by the fans 312 and 313. In this embodiment, the fans 312 and 313 are connected to the motors 314 and 315 via connectors 316 and 317, respectively; however, they may be directly connected to the motors 314 and 315, respectively.

The power generation unit 303 is composed of the four generators combined with each other. Each of the generators has a structure that an electrolyte film such as a proton conductor film is held between a hydrogen side electrode and an oxygen side electrode. Each of the oxygen side electrode and the hydrogen side electrode is formed by a metal plate, or a plate made from a porous metal material or a conductive material such as a carbon material. Current collectors are connected to these oxygen side electrode and hydrogen side electrode. The current collector is an electrode material for emergence of an electromotive force generated in electrodes, and is made from a metal material, a carbon material, or a non-woven fabric having conductivity. The four generators are disposed such that a pair of the generators superimposed to each other and another pair of generators superimposed to each other are disposed in parallel in the housing. The upper and lower generators paired with each other are superimposed to each other with the hydrogen side electrodes thereof opposed to each other. With this configuration, fuel can be readily supplied to the hydrogen side electrodes by feeding the fuel in a space between the hydrogen side electrodes opposed to each other, thereby to enable to activate the electrodes. Additionally, for the combined body of the pair of generators, the oxygen side electrodes are located on the front and back surfaces of the combined body of the pair of generators.

The power generation side connecting portion 305 is a mechanism portion, which is connected to the connecting portion 304 of the hydrogen storage cartridge 302 for introducing a fuel fluid in the fuel cell while keeping gas-tightness of the hydrogen storage cartridge 302. To be more specific, the leading end of the connecting portion 304 is inserted in the power generation side connecting portion 305, and in this case, when the leading end of the connecting portion 304 is further pushed in the power generation side connecting portion 305, it is locked with the power generation side connecting portion 305. As a result, during such a mounting operation, gas leakage is prevented. As a fuel fluid, in the case of adopting a direct methanol type using liquid fuel, that is, methanol in place of hydrogen gas, a removably mountable fuel fluid storage tank may be used in place of the hydrogen storage cartridge 302.

A mechanical flow rate adjusting mechanism can be provided in the power generation side connecting portion 305; however, according to the fuel cell in this embodiment, the flow rate adjusting portion 307 is disposed between the power generation side connecting portion 305 and the power generation unit 303. The flow rate adjusting portion 307 is provided for electronically or mechanically keeping the flow rate of fuel fluid at a constant value, for example, by controlling the pressure of fuel with a valve body or the like.

The control circuit portion 309 is a circuit for controlling an electromotive force outputted from the power generation unit 303. The control circuit portion 309 is also able to monitor the connection state between the fuel cell side and the hydrogen storage cartridge 302 on the fuel supply side, and adjust the output while detecting the state of a load to which the output is supplied, for example, adjust an output voltage depending on a mode (active mode, stand-by mode, or sleep mode) of an apparatus using an electromotive force outputted from the fuel cell. A circuit for controlling the motors 314 and 315 for driving the fans 312 and 313 may be provided for the control circuit portion 309. As a power used for the control circuit portion 309, there may be used part of a power generated by the power generation unit 303. A pair of output terminals 318 and 319 project from the control circuit portion 309, wherein leading ends of the output terminals 318 and 319 project outwardly from the card shaped housing 301.

In an embodiment, the fans 312 and 313 for supplying oxygen to the fuel cell and also promoting evaporation of moisture produced on the surfaces of the oxygen side electrodes are disposed on one side surface of the card shaped housing. When the fans 312 and 313 are rotated, air is guided to the surfaces of the oxygen side electrodes through the grooves (not shown). Accordingly, it is possible to effectively remove moisture produced on the surfaces of the oxygen side electrodes, and hence to prevent lowering of an output voltage.

According to the fuel cell in this embodiment, since the control circuit portion 309 is mounted on the fuel cell, the fuel cell can easily perform optimization of an output voltage, and control of the output voltage depending on environmental conditions. As a result, the fuel cell according to this embodiment is useful not as a simple power generation device but as a cell including an information processing function. Further, since leakage of a fuel fluid such as gaseous fuel in the connecting portion between the fuel cell and the fuel storage cartridge is prevented, it is possible to sufficiently ensure safety of the fuel cell system.

[Fourth Embodiment]

A fourth embodiment of the fuel cell of the present invention will be described below. In this embodiment, as shown in FIGS. 30 to 32, part of a plurality of grooves are used for evaporation of moisture produced on oxygen side electrodes and the other part thereof are used for heat radiation of electrodes.

Figure 30:
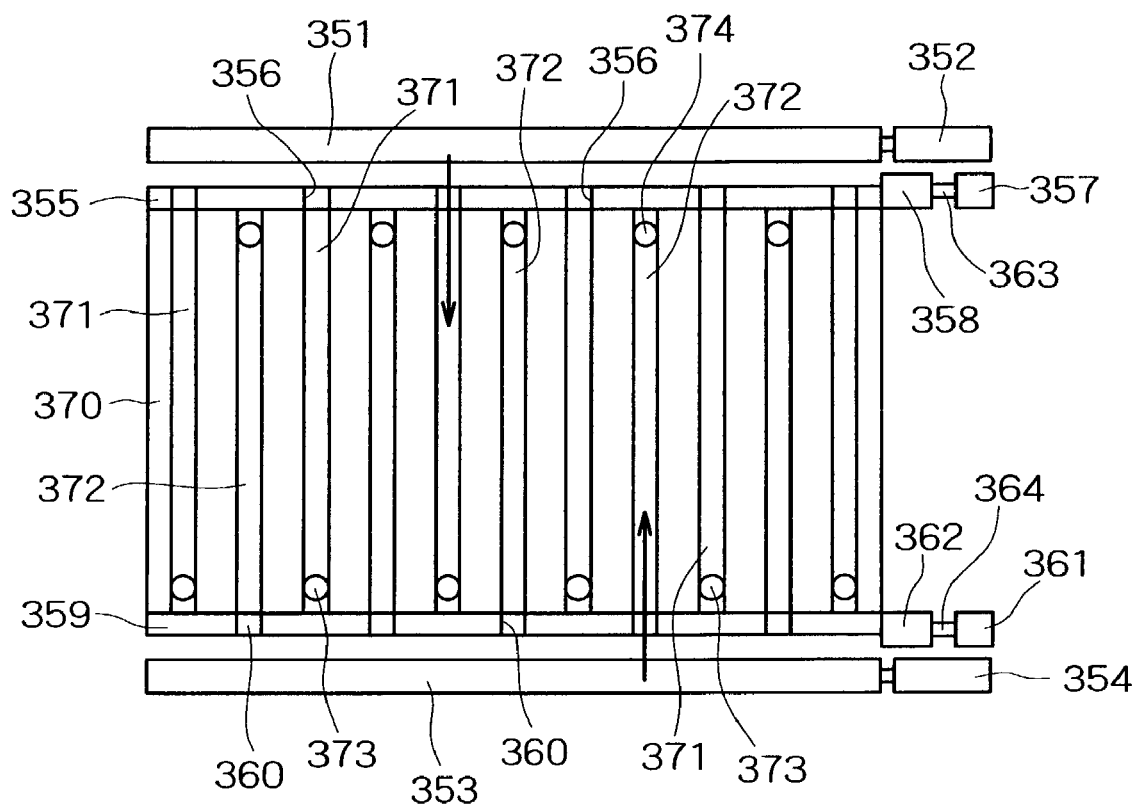
FIG. 30 is a typical plan view showing an essential portion of the fuel cell according to an embodiment of the present invention.

FIG. 30 shows grooves 371 and 372 extending over the surface of a generator, wherein the grooves 371 and 372 are used for evaporation of moisture and radiation of heat, respectively. As shown in this figure, the grooves 372 used for radiation of heat and the grooves 371 used for evaporation of moisture are alternately provided in a housing body 370. The grooves 371 and 372 extend substantially in lines in the direction along short sides of the generator between both the long side edges of the generators. Each of the grooves 371 and 372 is formed into an approximately rectangular shape in cross-section; however, it may be formed into any other shape such as a semi-circular shape or a V-shape.

Referring to FIG. 30, a fan 351 is provided in the vicinities of the depth side ends of the grooves 371 and 372, and a fan 353 is provided in the vicinities of the front side ends of the grooves 371 and 372. Each of the fans 351 and 353 has a structure that vane portions are formed around a cylindrical rotational shaft. The fans 351 and 353 are driven by motors 352 and 354, respectively, to feed air in the extending direction of the grooves 371 and 372. The roles of the fans 351 and 352 are different from each other. The fan 351 continuously feeds air in the grooves 371 for evaporation of moisture, to evaporate moisture on the surface portion, in the vicinity of a current collector, of the generator. On the other hand, the fan 353 continuously feeds air in the grooves 372 for radiation of heat, to control the temperature of the generator via a separator such that the temperature is not excessively increased. Air outlets 373 are formed at ends, on the side opposed to the fan 351 side, of the grooves 371 for discharging the air having passed through the grooves 371. Similarly, air outlets 374 are formed at ends, on the side opposed to the fan 353 side, of the grooves 372 for discharging the air having passed through the grooves 372.

Figure 31:
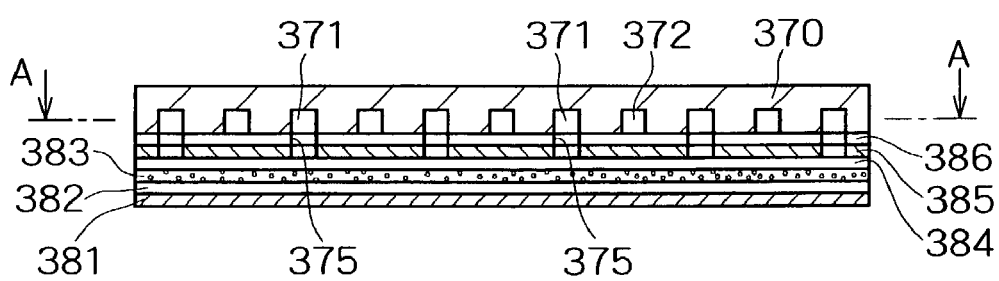
FIG. 31 is a sectional view showing an essential portion of the fuel cell according to an embodiment of the present invention.
Figure 32:
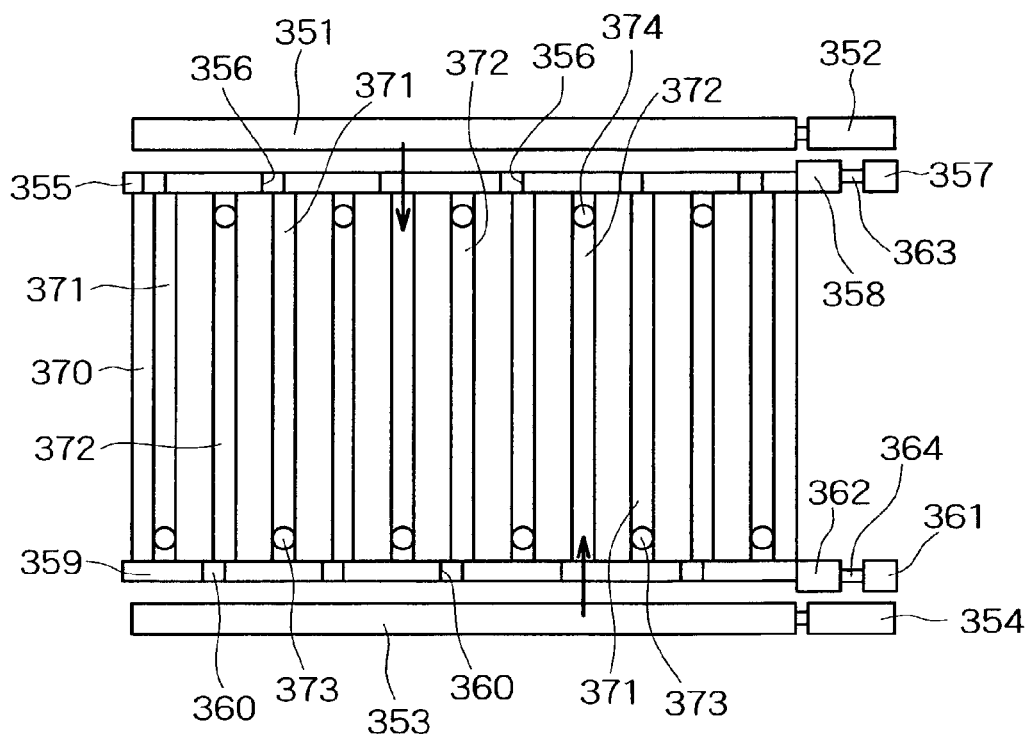
FIG. 32 is a plan view of the fuel cell according to an embodiment of the present invention, showing a state that shutters are closed.

FIG. 31 is a schematic sectional view of the generator of the fuel cell in this embodiment. As shown in this figure, the generator has a structure that a current collector plate 381, a hydrogen side electrode 382, an electrolyte film 383 as a proton conductor film, an oxygen side electrode 384, a current collector plate 385, and a separator 386 are stacked in this order from the lower side. The separator 386 is a film for electrical insulation of the generator, and has opening portions 375 communicated to the grooves 371. Accordingly, air having passed through the grooves 371 is not baffled by the separator 386, but is led to the vicinities of the current collector plate 385 and the oxygen side electrode 384 through the opening portions 375 of the separator 386, to evaporate moisture produced thereat and remove the evaporated moisture. On the other hand, since the opening portions 375 of the separator 386 are not communicated to the grooves 372 for radiation of heat, air having passed through the grooves 372 is baffled by the separator 386, and therefore, not led to the vicinities of the current collector plate 385 and the oxygen side electrode 384. The air baffled by the separator 386 is used to promote radiation of heat by carrying away heat transmitted via the separator 386. It is to be noted that the opening portions 375 formed in the separator 386 may be used not only for evaporation of moisture but also for supply of oxygen.

In an embodiment, rotation of the fan 351, the flow-in amount of air through the grooves 371 can be increased. In this case, the supply amount of oxygen to the fuel cell can be increased, and also moisture produced on the oxygen side electrode 384 can be removed by evaporation, to increase the output of the fuel cell. Meanwhile, by rotation of the fan 353 opposed to the fan 351, the flow-in amount of air through the grooves 372 can be increased. In this case, the radiation of heat from the surface of the separator 386 can be promoted. Accordingly, it is possible to control the output of the fuel cell to a stable value.

In addition, according to the fuel cell in this embodiment, a shutter 355 is provided for the grooves 371 for evaporation of moisture and a shutter 359 is provided for the grooves 372 for radiation of heat. The shutter 355 is connected to an opening/closing actuator 357 via connection portions 358 and 363. The shutter 355 can be shifted in the direction perpendicular to the extending direction of the grooves 371 by operating the actuator 357. Similarly, the shutter 359 is connected to an opening/closing actuator 361 via connecting portions 362 and 364. The shutter 359 can be shifted in the direction perpendicular to the extending direction of the grooves 372 by operating the actuator 361. FIG. 32 shows a state that the shutters 355 and 359 are both closed by operating the actuators 357 and 361. To be more specific, in the closed state, the positions of opening portions 356 of the shutter 355 are shifted from the positions of the grooves 371, and the positions of opening portions 360 of the shutter 359 are shifted from the positions of the grooves 372. When the shutters 355 and 359 are closed, air led by the fans 351 and 353 does not flow in the grooves 371 and 372, to suppress the degrees of evaporation of moisture and radiation of heat as compared with the state that the shutters 355 and 359 are opened. In this embodiment, the shutters 355 and 359 are both closed by operating the actuators 357 and 361; however, only one of the shutters 355 and 359 may be controlled by operating the corresponding one of the actuators 357 and 361. Also, the operation of the each fan may be interrupted and the rotational speed of the each fan be adjusted in place of provision of the shutter mechanism.

The fuel cell according to this embodiment is advantageous in that since not only the supply of oxygen but also heat radiation and removal of moisture can be performed, it is possible to realize a high output and a stable output of the fuel cell, and that since evaporation of moisture and radiation of heat can be independently controlled by the shutter mechanism, it is possible to further improve the control characteristic of the fuel cell.

[Fifth Embodiment]

Figure 33:
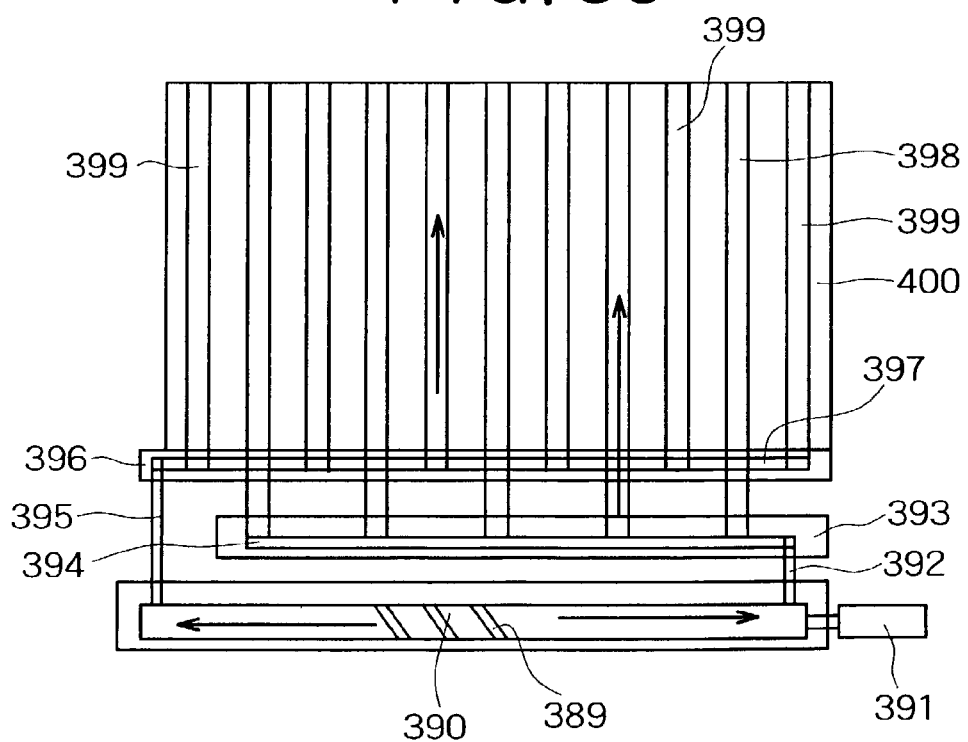
FIG. 33 is a plan view of a fuel cell according to a an embodiment of the present invention.
Figure 34:
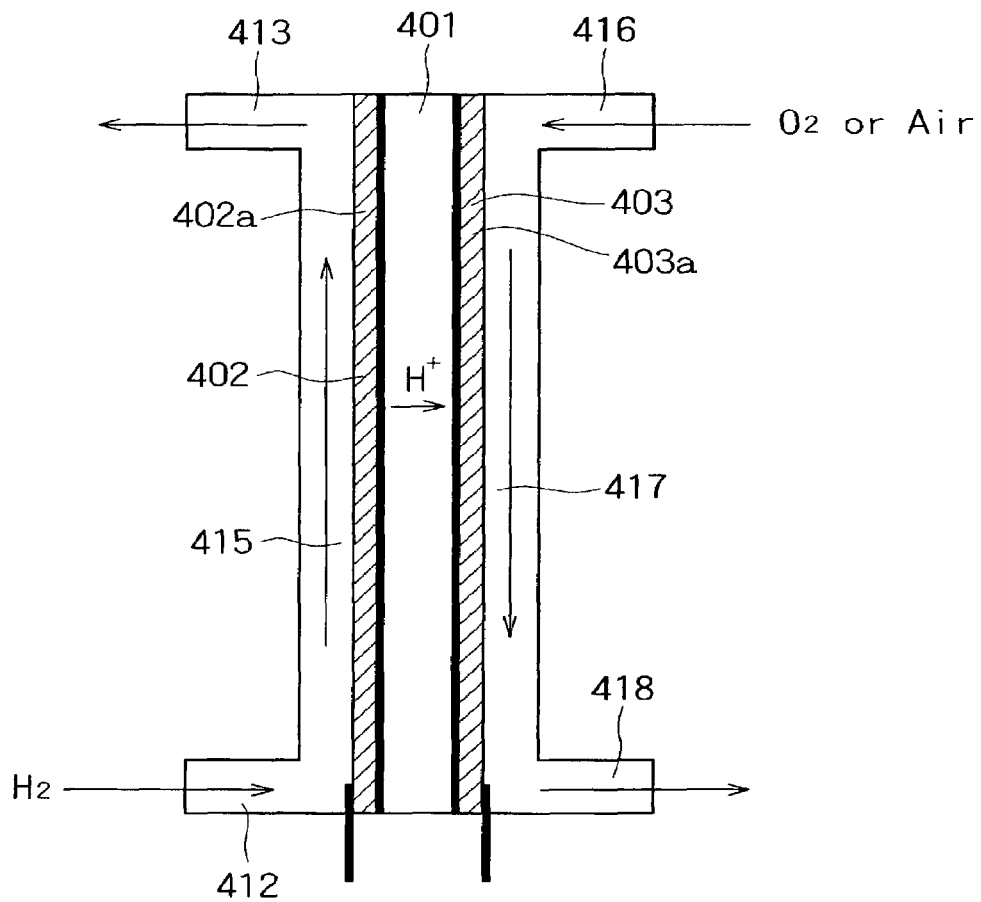
FIG. 34 is a schematic view showing one example of a general fuel cell using a proton conductor film.
Figure 35:
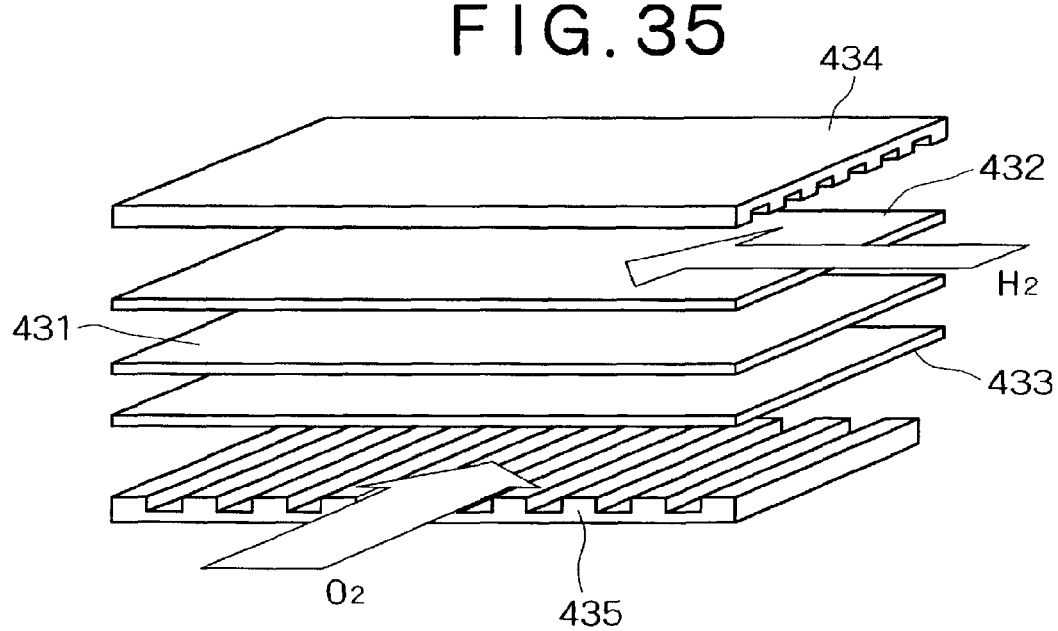
FIG. 35 is an exploded view in perspective of a related art fuel cell.
Figure 36:
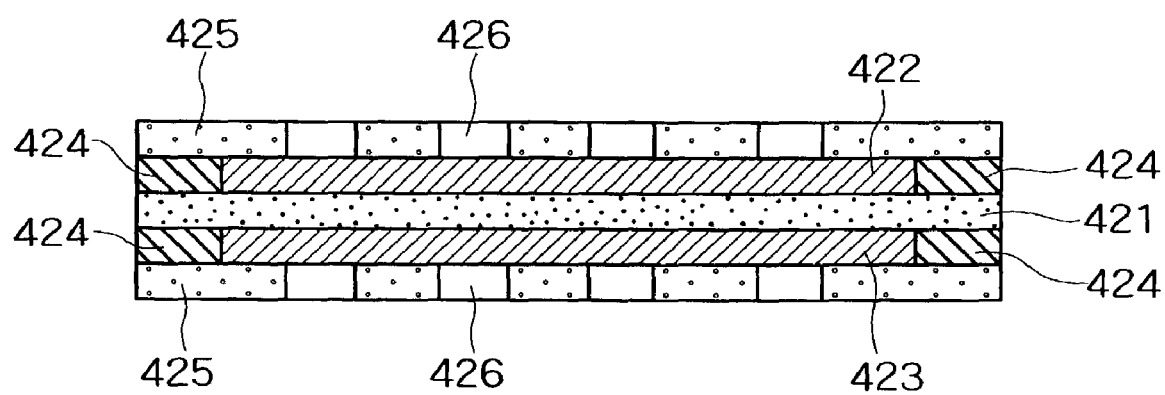
FIG. 36 is a sectional view showing another related art fuel cell.

A fifth embodiment of the fuel cell of the present invention will be described below. In this embodiment, radiation of heat and evaporation of moisture are realized by a single fan. As shown in FIG. 33, grooves 398 used for radiation of heat and grooves 399 used for evaporation of moisture are alternately provided in a housing 400. The grooves 398 and 399 extend substantially in lines in the direction along short sides of the generator between both the long side edges of the generators. Each of the grooves 398 and 399 is formed into an approximately rectangular shape in cross-section; however, it may be formed into any other shape such as a semi-circular shape or a V-shape. The grooves 398 used for radiation of heat pass on a separator of the generator, and the grooves 399 used for evaporation of moisture pass through opening portions provided in the separator of the generator.

A fan 390 as an air flow inducing means is provided at the front side ends of the grooves 398 and 399 in FIG. 33. It is to be noted that any air flow inducing means such as a fan is not provided on the depth side ends of the grooves 398 and 399 in FIG. 33. The fan 390 has a structure that a spiral vane portion 389 is formed around a cylindrical rotational shaft.

By rotation of a motor 391, air is made to flow along the axial direction of the rotational shaft. By changing the rotational direction of the motor 391 between the normal direction and the reverse direction, the flow direction of air can be changed between the direction from an end, on the motor side, of the fan 390 and the direction from an end, on the side opposed to the motor side, of the fan 390.

A plurality of the grooves 399 for evaporation of moisture are commonly connected to a groove 397 provided in a communication portion 396. The groove 397 is connected to an end, opposed to the motor 391, of the fan 390 via a pipe 395. Accordingly, when the motor 391 is rotated so as to feed air from the end, opposed to the motor 391, of the fan 390 (see an arrow in FIG. 33), the air is led in the plurality of grooves 399 for evaporation of moisture via the pipe 395 and the groove 397, to promote evaporation of moisture on the surface of a generator. A plurality of grooves 398 for radiation of heat are connected to a groove 394 provided in a communication portion 393. The groove 394 is connected to an end, on the motor side, of the fan 390 via a pipe 392. Accordingly, when the motor 391 is rotated so as to feed air from the end, close to the motor 391, of the fan 390 (see an arrow in FIG. 33), the air is led in the plurality of grooves 398 for radiation of heat via the pipe 392 and the groove 394, to promote radiation of heat on the surface of the generator. To prevent the flow of air in the reverse direction, a shutter or a valve may be provided on the way of each of the pipe 392 and 395.

Since radiation of heat and evaporation of moisture can be controlled by using the single fan, it is possible to reduce the number of parts, and hence to improve the power generation efficiency while reducing the cost of the fuel cell.

In this embodiment, the air flow inducing means is exemplified by the fan; however, it may be configured as a pump for causing a pressure difference between one and another portions of air, thereby allowing the air to flow in a specific direction.

While in the embodiments, description has been made by example of a notebook-size personal computer as an apparatus on which the fuel cell or fuel cell card of the present invention is mounted, the present invention is not limited thereto but may be applicable to portable printers or facsimiles, peripheral equipment used for personal computers, telephones, television receivers, communication equipment, portable terminals, watches, cameras, audio video equipment, electric fans, refrigerators, irons, pots, cleaners, rice boilers, electromagnetic cooking devices, lighting devices, toys such as game machines or radio-controlled cars, electric tools, medical equipment, measurement devices, on-vehicle equipment, business machines, a health/beauty instruments, electronically-controlled robots, wearing type electronic equipment, transfer machines or the like.

While in this embodiment, description has been made by way of an example mainly using hydrogen gas as fuel, alcohol (liquid) such as methanol adaptable to a so-called direct methanol type may be used as fuel or other suitable fuel sources.

According to the fuel cell in an embodiment of the present invention, since the air flow inducing means is provided in the housing of the fuel cell, even if moisture remains on the oxygen side electrodes, such moisture can be certainly removed by the air flowing on the oxygen side electrodes by the air flow inducing means. Since the substantially flat-plate shaped generators are provided in the housing of the fuel cell and the opening portions are formed in the housing, it is possible to certainly supply air to the oxygen side electrodes of the generators through the opening portions formed in the housing. The air flow inducing means, which allows air around the air flow inducing means to flow, is disposed in the housing at positions corresponding to those of the opening portions formed in the housing, it is possible to realize the induction of the flow of air without the need of a large space.

According to the fuel cell in an embodiment of the present invention, since the oxygen side electrodes of the generators can be opened to atmosphere, it is possible to supply oxygen to the generators without lowering of a pressure, that is, a partial pressure of oxygen in air. Although moisture is produced on the surfaces of the oxygen side electrodes of the generators at the time of generation of an electromotive force, such moisture can be desirably removed because the oxygen side electrodes are opened to atmosphere through the large opening portions formed in the housing.

According to the function card and the fuel cell in an embodiment of the present invention, the fuel cell card can be inserted in a card insertion slot of a notebook-size personal computer as the apparatus main body and be mounted to the notebook-side personal computer. In particular, by using the fuel cell card having the same size as the standardized PC card size for portable equipment, it is possible to prolong the service time of the portable equipment. Although a plurality of the generators are disposed in the housing of the PC card, oxygen can be supplied to the oxygen side electrodes with a sufficient pressure because the oxygen side electrodes are opened to atmosphere, with a result that it is not required to provide any gas supply means such as a gas cylinder or a pump. As a result, it is possible to realize space-saving in the fuel cell, and to eliminate the need of provision of any additional auxiliary device.

According to the fuel cell and the fuel supply mechanism for the fuel cell in an embodiment of the present invention, the hydrogen supply portion having the upper and lower hydrogen side current collectors is disposed such that the back surface of the upper hydrogen side current collector and the front surface of the lower hydrogen side current collector are opposed to each other, and the generators are disposed so as to be stuck on the front surface of the upper hydrogen side current collector and the back surface of the lower hydrogen side current collector. Accordingly, the generators are stuck, from above and below, on the common gas supply portion, that is, the hydrogen supply portion, with a result that the power generation area of the generators can be increased. Since the insulating films are held as a spacer between the hydrogen side current collectors, hydrogen as a fuel gas can be certainly supplied to the flat-plate shaped generators stuck, from above and below, on the outer sides of the hydrogen side current collectors through the opening formed in the spacer. In particular, if each of the insulating films is made from a synthetic resin such as polycarbonate, such an insulating film can function as an elastic member, which is elastically deformed to cause uniform contact between the pair of flat-plate shaped generators and the current collectors when the generators are brought into press-contact with the hydrogen side current collectors. As a result, it is possible to easily obtain the uniform press-contact state between the generators and the hydrogen side current collectors.

According to the generator and the fuel in an embodiment of the present invention, the large hole formed in the seal material is fitted to the outer peripheral edge of the hydrogen side electrode smaller than the proton conductor film, and the oxygen side electrode side is basically opened to atmosphere via the large opening portions of the oxygen side current collector stuck on the oxygen side electrode, and therefore, it does not require any gas seal. This is advantageous in reducing the number of parts and the number of assembling steps. Also, since the seal material having elasticity is contracted in the thickness direction when the current collector is pressed to the generator, to realize uniform contact between the current collector and both the seal material and the hydrogen side electrode inside the seal material, thereby improving electrical characteristics of the fuel cell. In addition, since no seal material is present on the oxygen side electrode side, the rigidity of the oxygen side electrode can be ensured because the oxygen side electrode is not affected by characteristics of the seal material, with a result that it is possible to significantly improve the gas-tightness characteristic of the generator.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An apparatus comprising:
   a device having a main body and a card slot;
   a function card inserted in the card slot and mounted to the main body of the device; and
   a fuel storage portion removably mounted to the function card;
   wherein the function card includes
      a generator including a proton conductor film, and an oxygen side electrode and a hydrogen side electrode opposed to each other with said proton conductor film put therebetween, said generator being disposed in a housing of said function card, wherein power is generated by taking oxygen from a gas inlet portion formed in said housing to said oxygen side electrode in an atmosphere open state and supplying fuel selected from the group consisting of a fuel gas and a fuel liquid to said generator, and
      a first connector portion to be locked with a respective second connector portion formed on a bottom portion of said card slot of said main body when said function card is inserted in said main body;
   wherein power is capable of being outputted through said first connector portion of said function card, and wherein information is transferred between a first I/O portion associated with said function card and a second I/O portion associated with the fuel storage portion, and
   wherein the fuel storage portion is removably mounted to a region, opposite to said main body, of said housing of said function card.

2. An apparatus according to claim 1, wherein information on power generation is inputted or outputted in or from said connector portion of said function card via the first I/O portion.

3. An apparatus according to claim 1, wherein when said function card is mounted to said main body, a power generated by said function card is taken out from part, facing to said main body, of said housing of said function card.

4. An apparatus function card according to claim 1, wherein said function card is formed into a size standardized under a JEIDA/PCMCIA standard.

5. An apparatus according to claim 1, wherein said function card has the same size as that of Type I standardized under a JEIDA/PCMCIA standard, and a combined body of said function card and a fuel gas storage portion mounted to said function card has the same size as that of Type II standardized under the JEIDA/PCMCIA standard.

6. A function card inserted in a card slot provided in a peripheral device selectively mountable to an apparatus main body and mounted to said peripheral device, comprising:
   a generator including a proton conductor film, and an oxygen side electrode and a hydrogen side electrode opposed to each other with said proton conductor film put therebetween, said generator being disposed in a housing of said function card;
   wherein power is generated by taking oxygen from a gas inlet portion formed in said housing to said oxygen side electrode under atmospheric conditions and supplying any one of a fuel gas and a fuel liquid to said generator; and
   a connector portion to be locked with a connector portion formed on a bottom portion of said card slot of said main body when said function card is inserted in said main body;
   wherein power is capable of being outputted through said connector portion of said function card, and wherein information is transferred between a first I/O portion associated with said functional card and a second I/O portion associated with a fuel storage portion removably mounted to a region, opposite to said main body, of said housing of said function card.

7. An apparatus according to claim 1, wherein said information includes at least one of a datum for an amount of supplying fuel from said fuel storage, a datum for pressure fuel in at least one of said function card and said fuel storage, a datum for temperature in at least one of said function card and said fuel storage, and a datum for monitoring a connection state between at least one of said function card and said fuel storage.

* * * * *